United States Patent [19]
Walls et al.

[11] Patent Number: 6,088,005
[45] Date of Patent: Jul. 11, 2000

[54] DESIGN AND METHOD FOR A LARGE, VIRTUAL WORKSPACE

[75] Inventors: Jeffrey J. Walls; Ian A. Elliott; John Marks, all of Fort Collins, Colo.

[73] Assignee: Hewlett-Packard Company, Palo Alto, Calif.

[21] Appl. No.: 08/584,755

[22] Filed: Jan. 10, 1996

[51] Int. Cl.$^7$ .............................. G06F 15/00; G06T 1/00
[52] U.S. Cl. ................... 345/4; 345/121; 345/903
[58] Field of Search ................. 345/1, 2, 4, 119–121, 345/127, 903

[56] References Cited

U.S. PATENT DOCUMENTS

| | | | |
|---|---|---|---|
| 5,289,574 | 2/1994 | Sawyer | 395/332 |
| 5,361,078 | 11/1994 | Caine | 345/1 |
| 5,467,102 | 11/1995 | Kuno et al. | 345/1 |
| 5,523,769 | 6/1996 | Lauer et al. | 345/1 |

OTHER PUBLICATIONS

Bartram et al., "The Intelligent Zoom as Metaphor and Navigation Tool in a MultiScreen Interface for Network Control Systems", IEEE International Conference on Systems, Man and Cybernetics, Oct. 22, 1995, pp. 3122–3127.

Fitzgerald et al., "Evaluating Alternative Display Sharing System Architectures", Proceedings of TRICOM '91—IEEE Conference on Communications Software, Apr. 18, 1991, pp. 145–157.

*Primary Examiner*—Matthew M. Kim
*Assistant Examiner*—U. Chauhan

[57] ABSTRACT

A system and method for a computer system to recognize and initialize an arrangement of a plurality of physical monitors as a single logical screen (SLS). The invention translates a user's window operation request directed to the SLS into an SLS function. The SLS function is then translated into a plurality of device dependent functions, each of which performs the user's requested window operation on one physical monitor. The translation of the SLS function comprises an unwrapping of the SLS function by removing the SLS function and installing the plurality of device dependent functions, and the wrapping of the plurality of device dependent functions by removing the plurality of device dependent functions and installing the SLS function. The invention implements each of the unwrapping and wrapping operations in two assignment instructions. The invention further comprises the capability of generating a single simultaneous display wherein the image on one physical monitor is displayed on each physical monitor of the SLS configuration.

42 Claims, 17 Drawing Sheets

SLS X SERVER

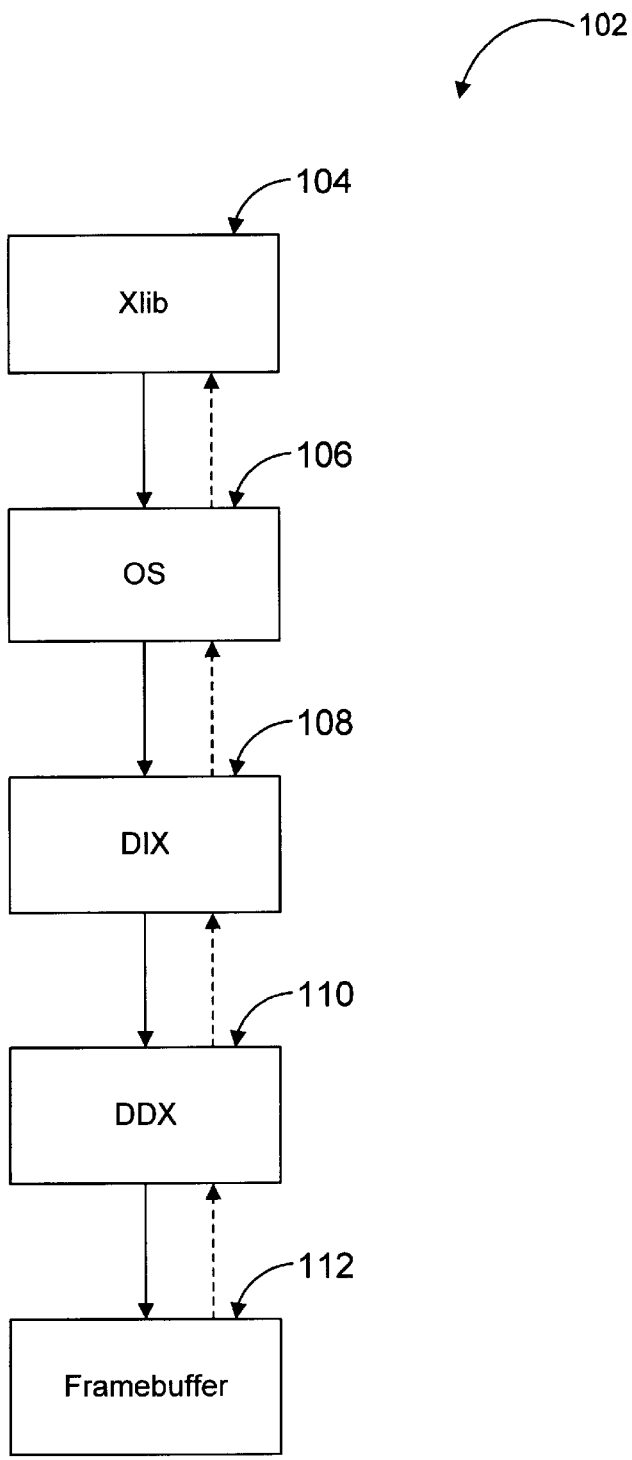
FIG. 1  X SERVER

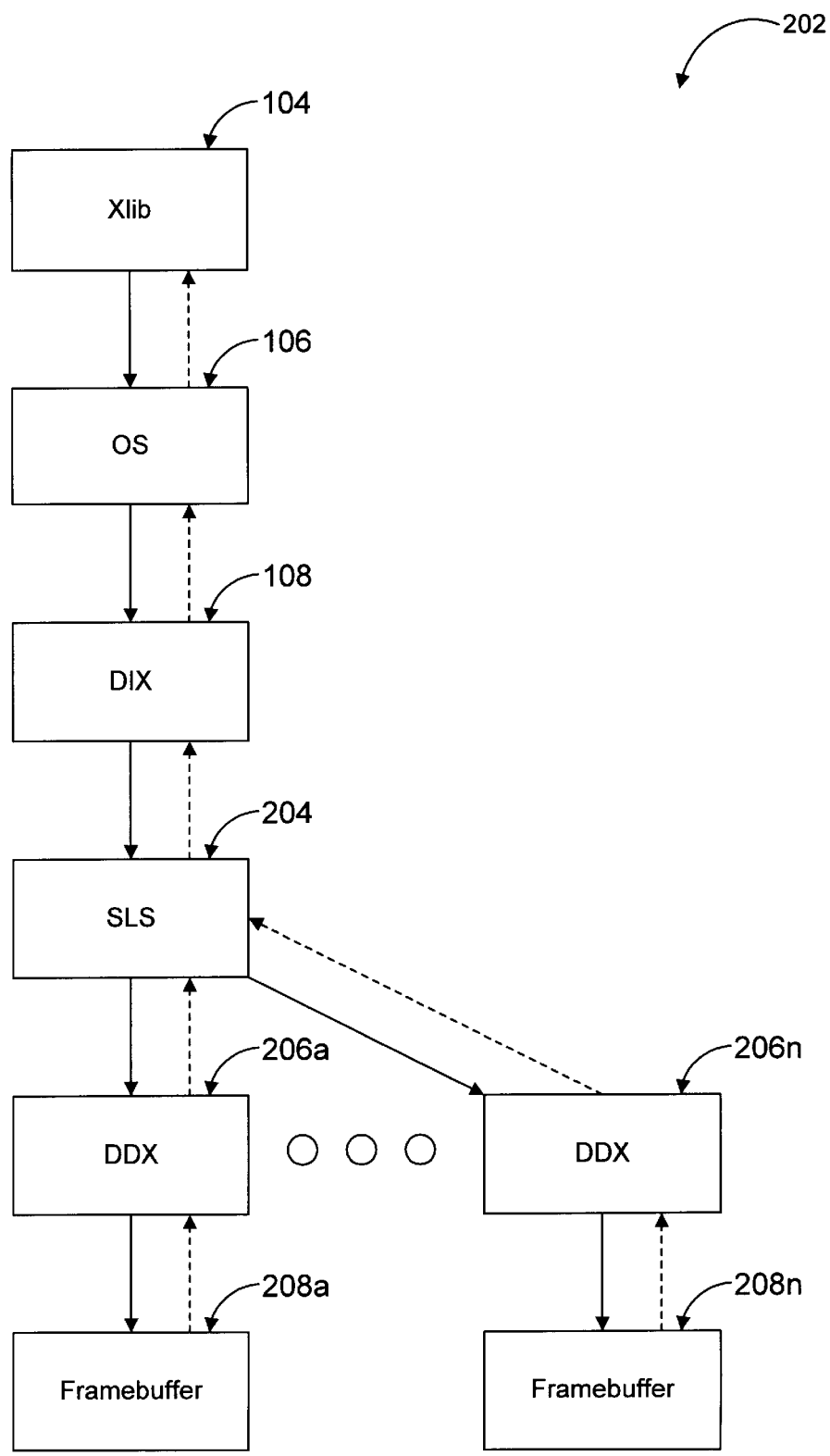
FIG. 2 SLS X SERVER

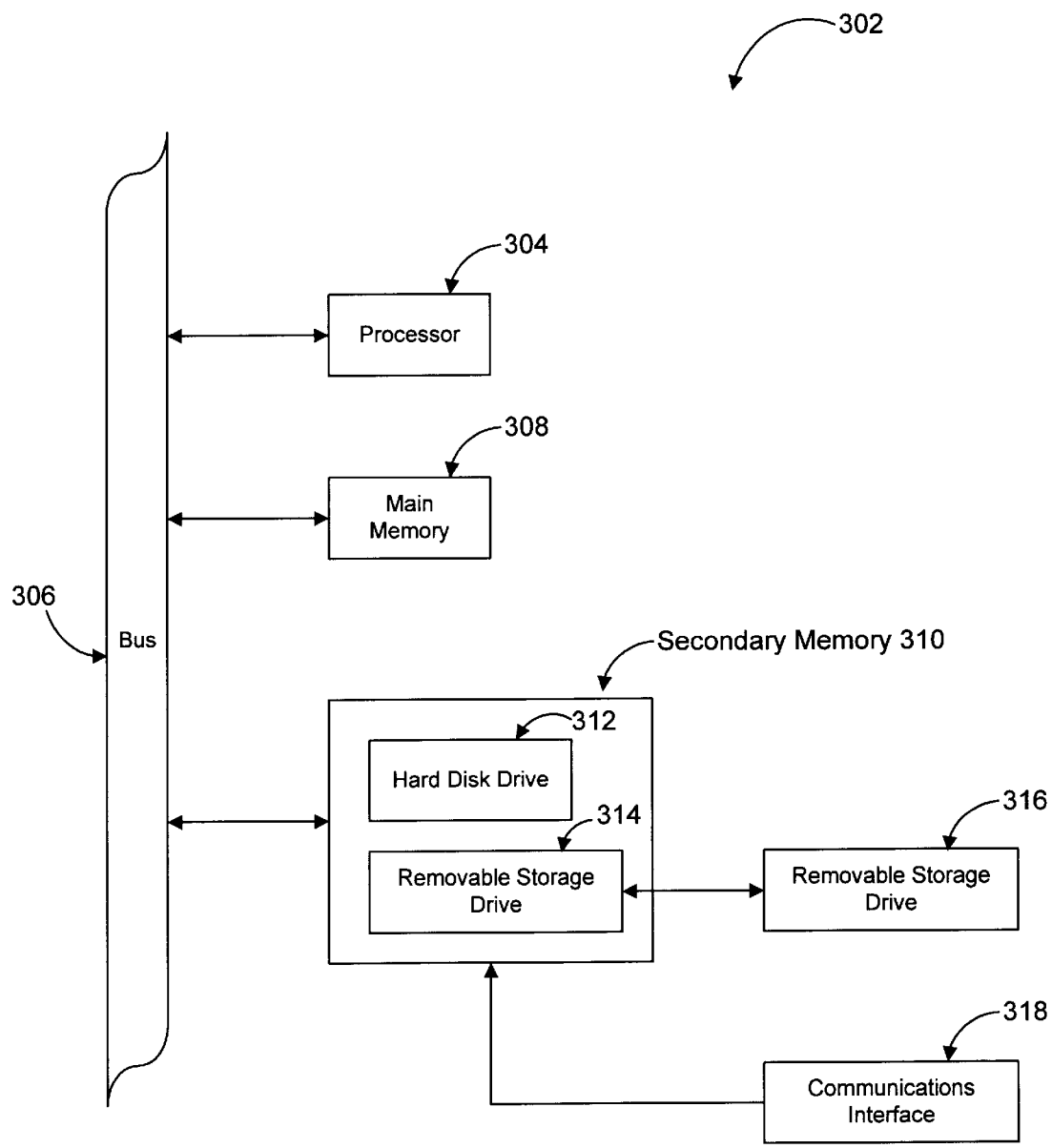
FIG. 3  EXEMPLARY COMPUTER SYSTEM

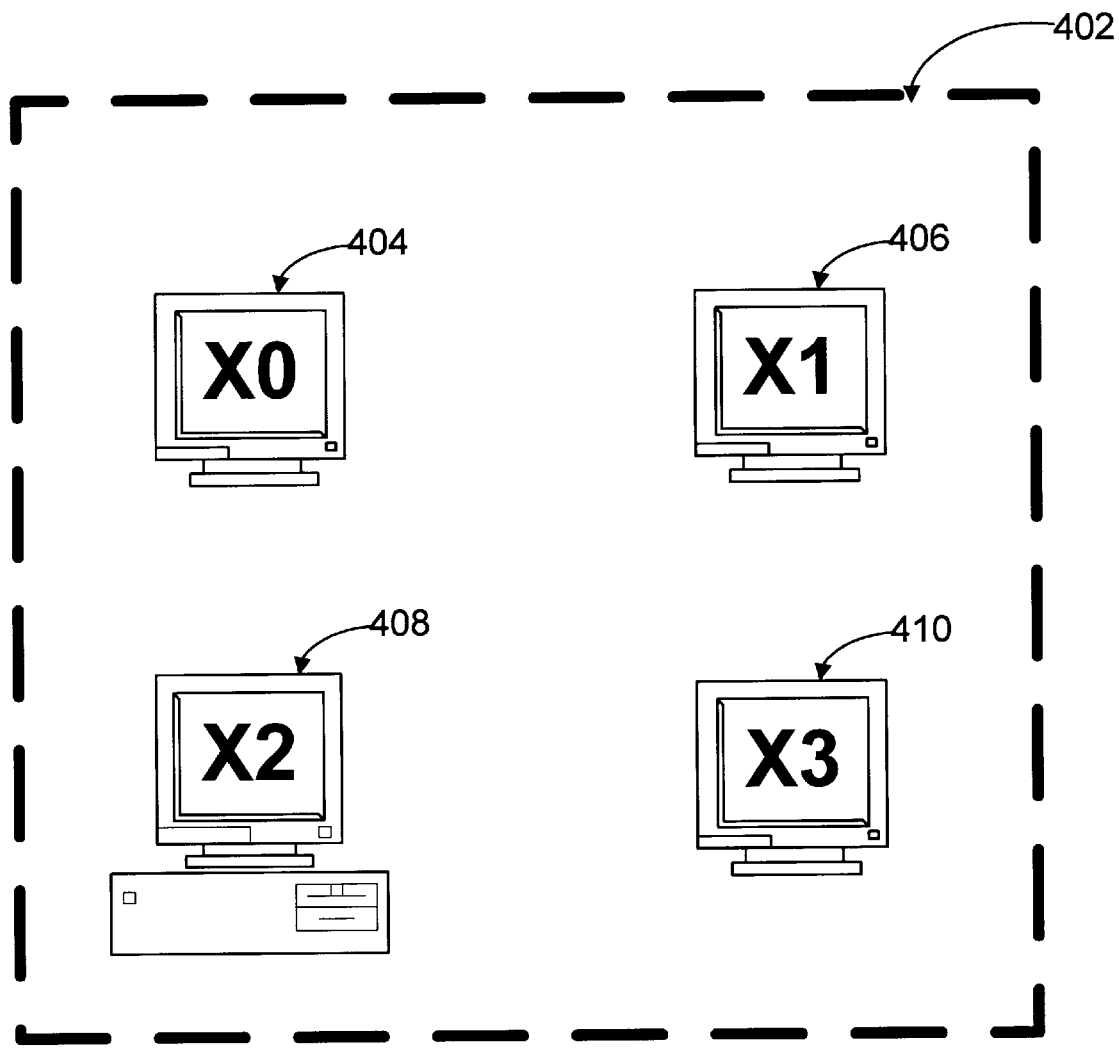
FIG. 4 SLS SCREEN

X,Y OFFSET VALUES

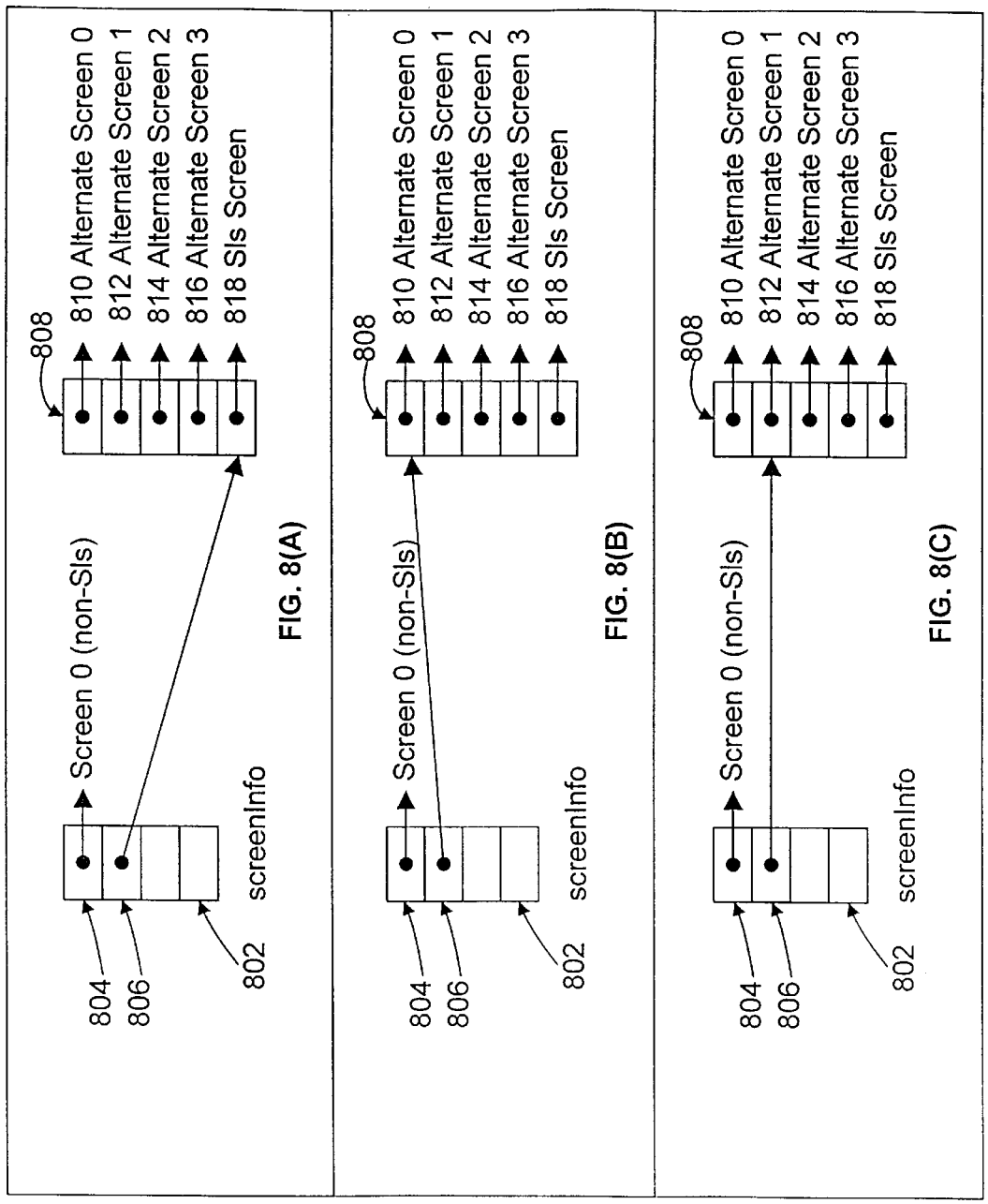

LINKED KIN WINDOWS

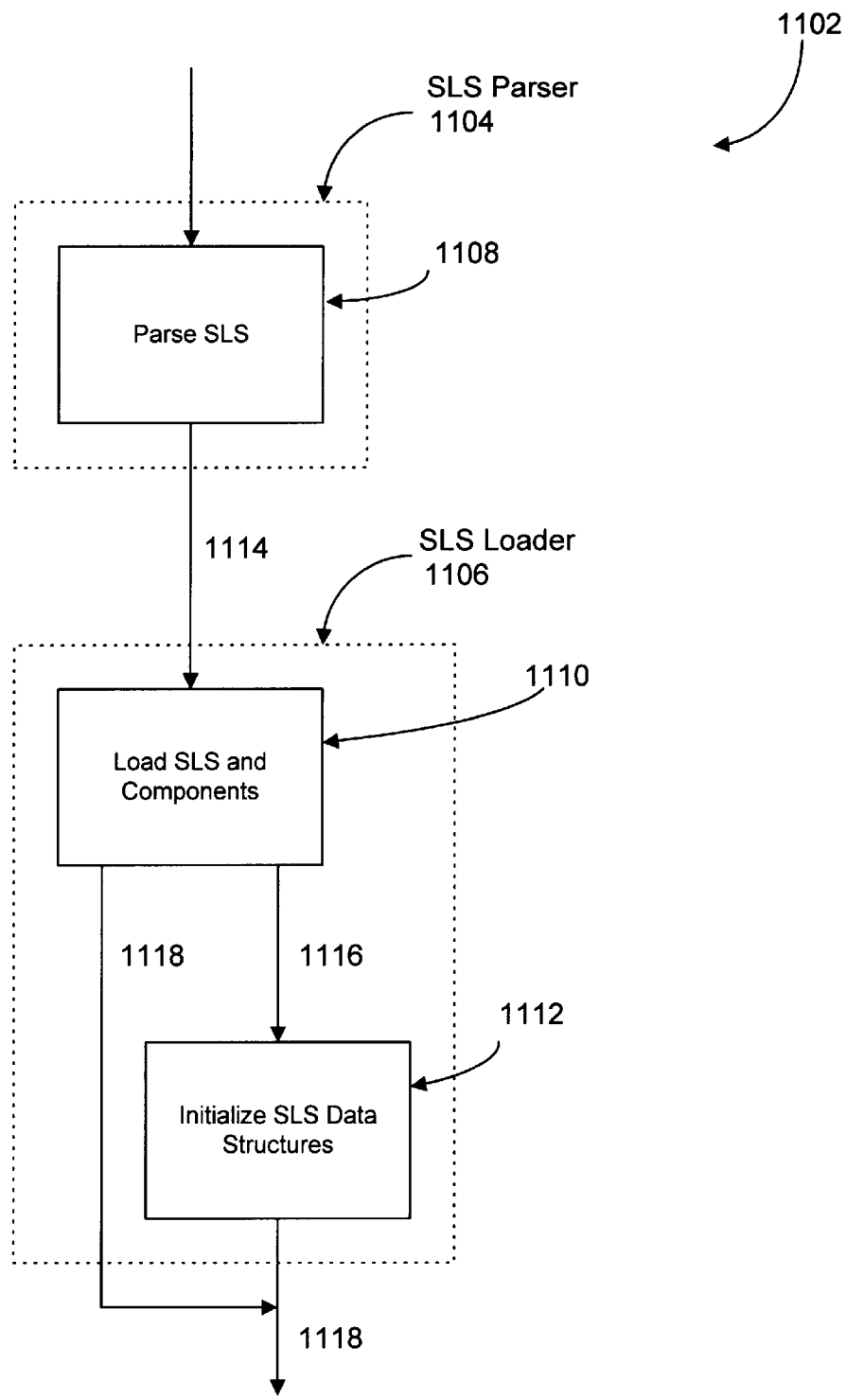
FIG. 11 SLS X-SERVER INITIALIZATION

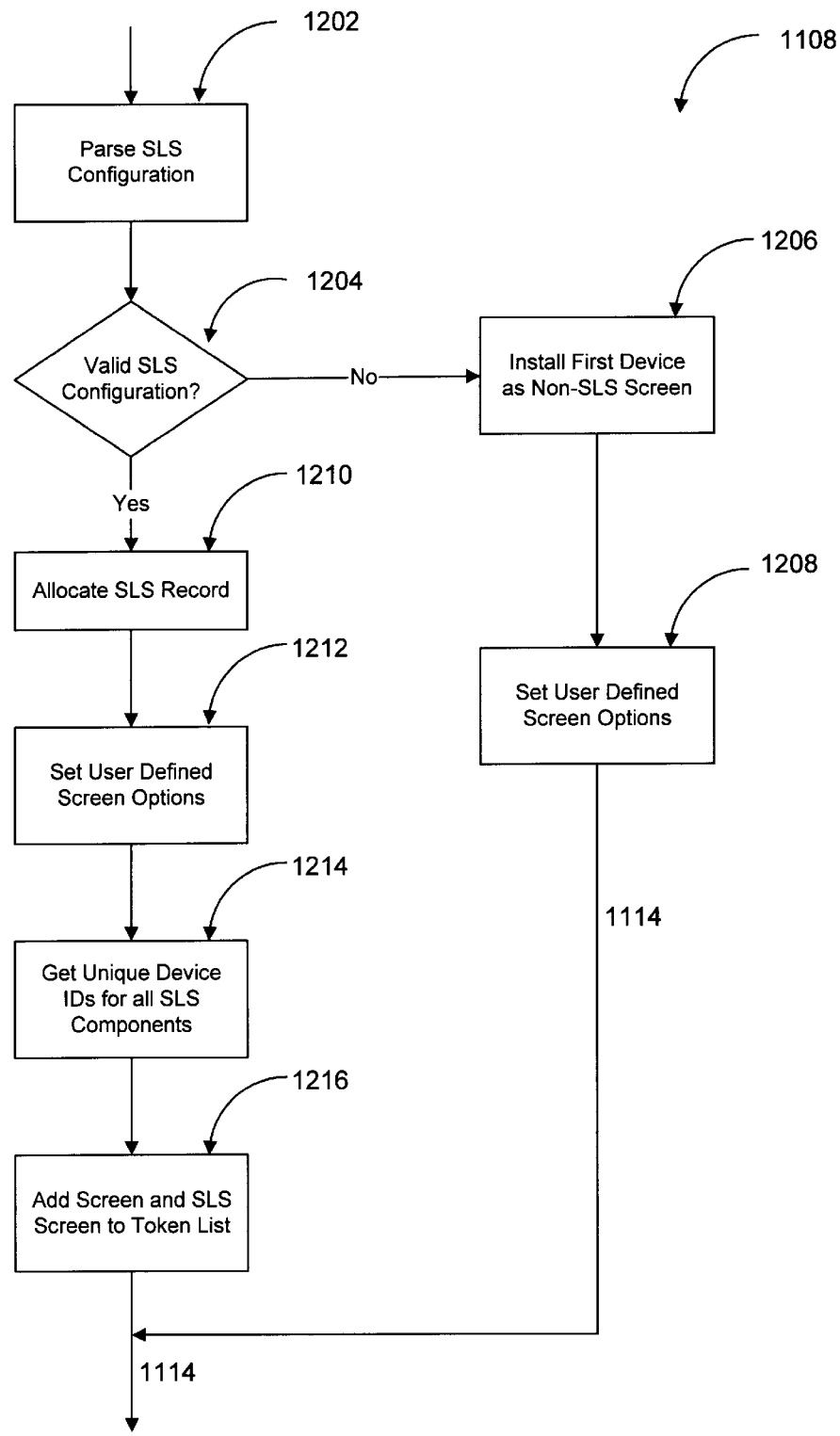
FIG. 12 PARSE SLS

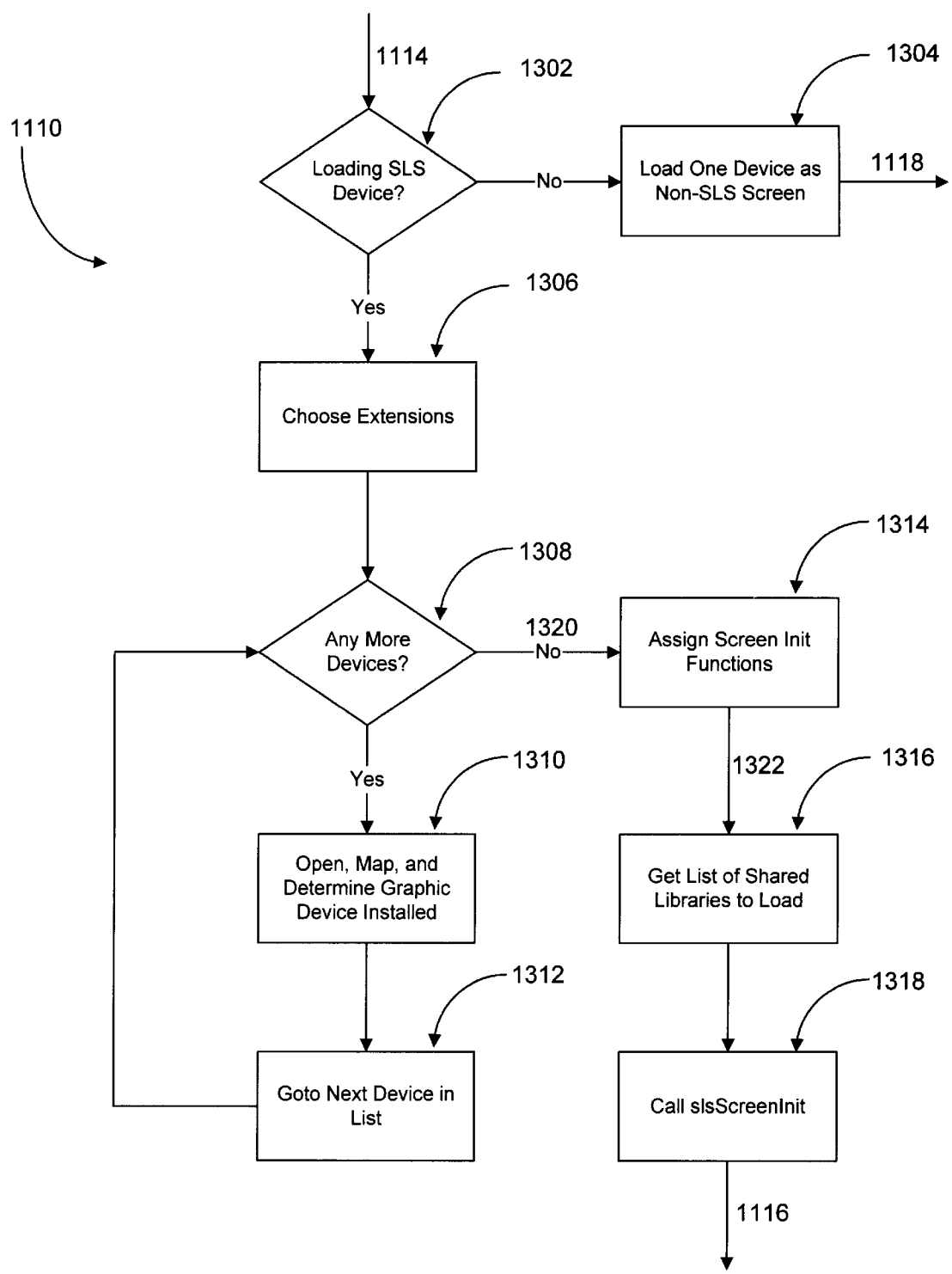
FIG. 13 LOAD SLS

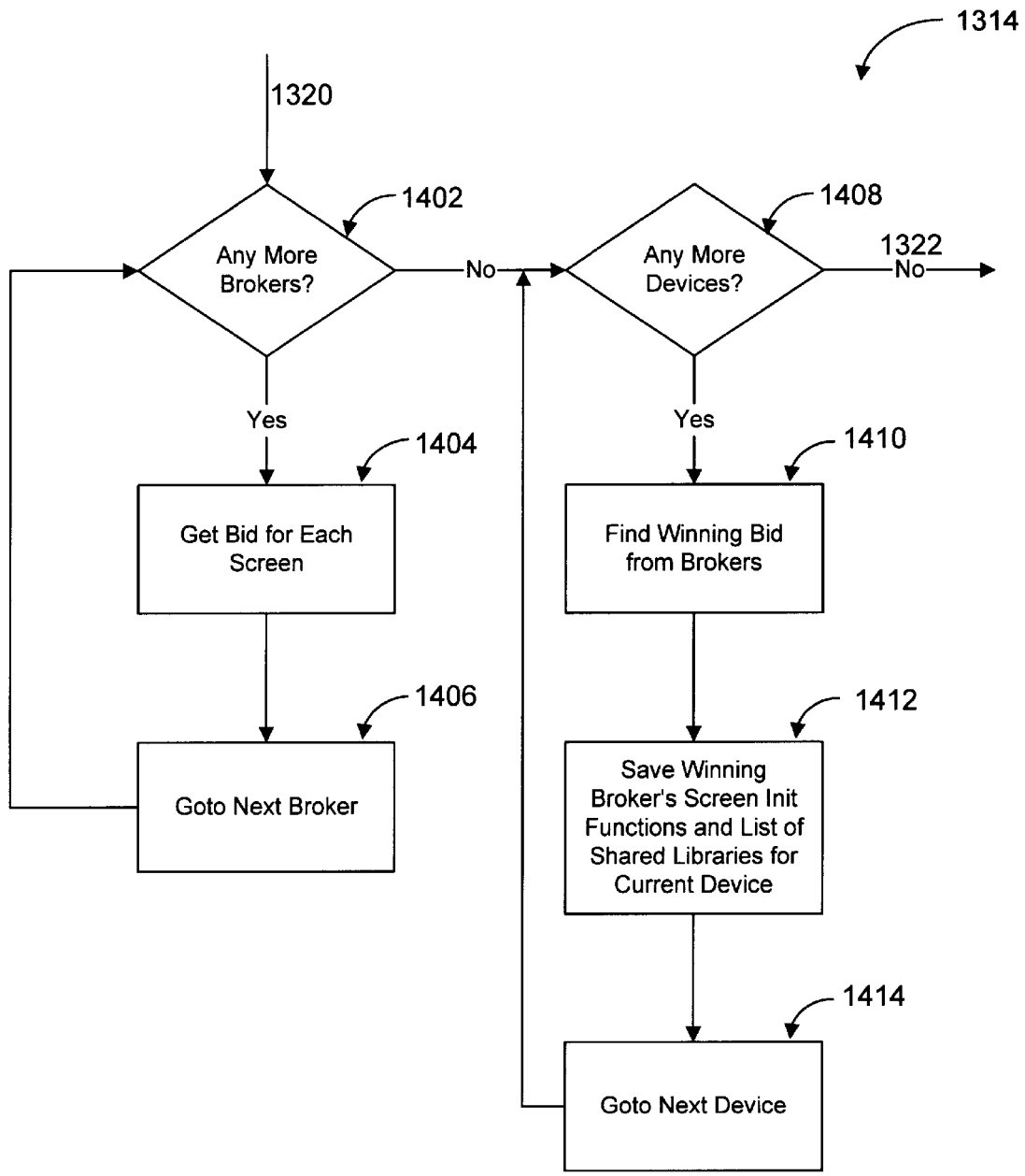
FIG. 14 ASSIGN SCREEN INIT FUNCTIONS

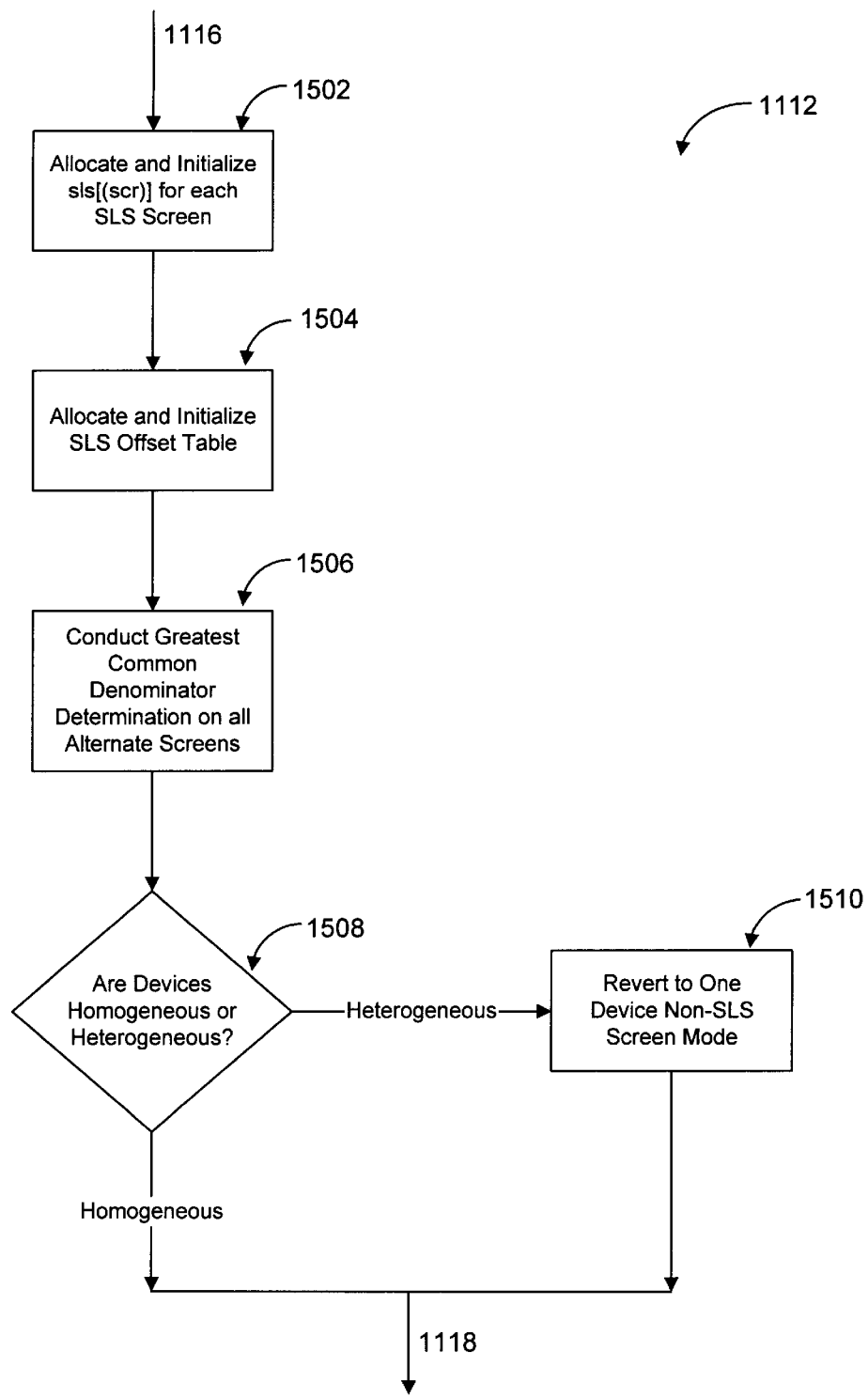
FIG. 15 INITIALIZE SLS DATA STRUCTURES

DESIGN AND METHOD FOR A LARGE, VIRTUAL WORKSPACE

BACKGROUND OF THE INVENTION

1. Field of the Invention

This invention relates to network-based graphics windowing systems, and more specifically to a network window server that creates and manages a single logical screen comprised of multiple physical monitors.

2. Related Art

The X Window System is a standard for the implementation of network-based UNIX window systems. The X Window System provides users and developers with the functionality for creating and managing a window environment in a network-based computer system.

The X Window System Server, X-Server, is a multiuser device that controls the shared access to X Window resources through a standard interface called Xlib. Each executing X-Server manages a single graphics display consisting of a keyboard, a pointing device, such as a mouse, and one or more graphics hardware device each having one or more associated physical monitors. Physical monitors can differ in size, while graphics hardware devices differ in depth, and visual classes. The visual classes provide such information as: whether the graphics hardware supports color or grayscale, whether the set of displayable colors or shades of gray is fixed in hardware or can be changed, and if the monitor supports color, whether the intensities of red, green, blue primary colors are determined from a single lookup table or from individual tables, and the depth of the graphics hardware device which is the number of bits needed to represent a color.

The X-Server operates in two (2) multi-head configurations which are configurations comprising multiple physical monitors. The multi-head configurations are multi-seat and multi-screen. A multi-seat configuration comprises a graphics display dedicated to each user. Therefore, each user has a keyboard, mouse, one physical monitor, plus an X-Server to manage the graphics display. The graphics displays are completely independent of each other. A multi-screen configuration comprises a single graphics display connected to multiple physical monitors. Therefore, a user has a keyboard, mouse, multiple physical monitors, and one X-Server. A cursor on one physical monitor can be moved between the physical monitors. The X-Server, however, is limited in that it cannot create, move, nor span windows across the physical monitors. Window borders are restricted to the size and location of the physical monitor on which they were created.

This problem is most prevalent in two-dimensional graphic systems requiring the display of large amounts of data that cannot be completely displayed on one physical monitor. Examples of such large data systems include: real estate, financial (such as the stock market), control room, large engineering processes, military mapping, and telecommunications. Each of these systems requires the output of large amounts of data which can easily exceed the display capacity of a single physical monitor. A user can only view these large data sets by panning and zooming. Multiple screens are needed to shuffle between the layers of individual windows.

A user of a multiple physical monitor system would greatly benefit if the X-Server managed the multiple physical monitors as a single logical screen in which windows, as well as the pointer, can cross physical monitor boundaries. Therefore, the user could manipulate the single logical screen just as if it were a single physical monitor. The user would have full screen capabilities across each of the individual physical monitors, thereby providing the full presentation of large amounts of data in a useful format.

There are several commercial products that address this problem. Some of these products are briefly presented and discussed below:

MOSART (Mosaic Array Technology) is a software product that is a joint development effort between Sun Microsystems, Inc. and Bell SYGMA Telecom Solutions, and is wholly owned and marketed by Bell SYGMA Telecom Solutions. MOSART controls the partitioning and management of very large X windows that can be shown on a mosaic of multiple graphics displays. However, MOSART executes multiple X-Servers, one on each graphics display, thereby resulting in low interactivity speeds with the network.

QUADRATE, marketed by GeoScene, is an adaptation of the color frame buffer (CFB) portion of the X-Server. A CFB is a generic hardware driver for graphics having a framebuffer with multiple bits per pixel. A CFB is extremely slow in operation. In QUADRATE, information from a virtual frame buffer, which defines the virtual screen, is distributed to the multiple graphics displays. In addition, this product requires an X-Server executing on each graphics display. As a result of these implementation details, QUADRATE offers very slow response times to user window requests.

Xvan, developed by Sun Microsystems, Inc., is also a rewrite of the X-Server to display data across multiple monitors. Similar to the other products, Xvan implements a virtual frame buffer. Xvan, however, is very vendor specific and requires the use of specific hardware devices.

Metheus, a PC hardware and software solution for multiscreen displays which is not available for Unix based systems, features an X-Server executing on top of Windows, thereby resulting in slow response times. Metheus is also very expensive in that it requires specialty graphics boards.

These products provide alternative solutions that are either too slow, too hardware specific, or too expensive. Therefore, there is a need to efficiently manage multiple physical monitors of a network window system as one logical screen in which the single logical screen retains the fill capabilities and functionality of a physical monitor.

SUMMARY OF THE INVENTION

This invention solves the problem of managing multiple physical monitors as a single logical screen, SLS, by adding an SLS layer to the X-Server protocol, thereby creating an SLS X-Server. An SLS X-Server is generated when a server is initialized. At initialization, a user establishes the configuration of the SLS by defining the physical arrangement of the multiple physical monitors. The SLS X-Server then allocates SLS data structures and initializes the multiple physical monitors that comprise the SLS.

It is a feature of the present invention that the SLS layer provides a mechanism for translating a user's SLS window operation request to multiple physical monitors. Thus, a user possesses fill screen capabilities in an SLS environment, such as moving, spanning, and resizing windows, as well as moving the pointer, across physical monitor boundaries.

It is another feature of the present invention that the SLS layer translates between SLS-level window functions and low-level device dependent window functions, which control the physical monitors, by executing two simple assignment instructions.

It is another feature of the SLS layer that it requires no intrusive code in the protocol layers of an X-Server. Therefore, the SLS layer can be installed in an X-Server as a dynamically loaded driver and is portable to other operating systems with minimal effort.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 1 is a block diagram illustrating the organization of an X-Server;

FIG. 2 is a block diagram illustrating the organization of an SLS X-Server;

FIG. 3 is a block diagram illustrating an exemplary computer system;

FIG. 4 illustrates an SLS comprised of an arrangement of physical monitors;

FIGS. 8(A)–(F) collectively illustrate the translation of an SLS function to alternate screen functions;

FIG. 11 is a control flow diagram illustrating an SLS X-Server initialization;

FIG. 12 is a control flow diagram illustrating parse SLS;

FIG. 13 is a control flow diagram illustrating load SLS;

FIG. 14 is a control flow diagram illustrating assign screen unit functions; and FIG. 15 is a control flow diagram illustrating initialize SLS data structures;

DETAILED DESCRIPTION OF THE PREFERRED EMBODIMENTS

Figure 5A:
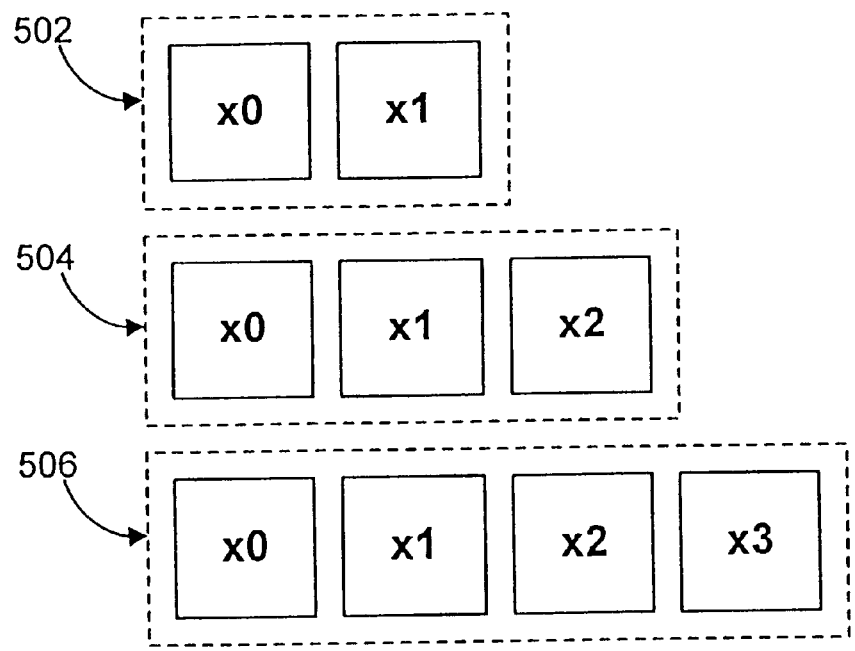
FIGS. 5(A)–5(D) illustrate possible SLS configurations.

The present invention solves the problem of managing multiple physical monitors as a single logical screen. More specifically, the present invention has implemented data structures and functionality to support an SLS layer in the X-Server organization, thereby creating an SLS X-Server.

FIG. 1 illustrates the organization of an X-Server 102 and how the parts of an X-Server 102 interact with each other. The Xlib 104 is a C-language X-library that provides an interface to X window functions. Clients invoke Xlib 104 functions to execute core X window protocol. The Xlib 104 takes a client's X Window request, packages it up, and sends it to the appropriate X-Server's Operating System layer (OS) 106.

The OS 106 encapsulates the X-Server functions that vary with specific operating system features. The OS 106 manages client connections, reads requests from clients, writes events and replies back to clients, manages connection authorization schemes, and provides memory allocation and deallocation routines. The OS 106 reads the request from the Xlib 104, and sends it to the Device-Independent layer (DIX) 108.

The DIX 108 contains the parts of the X-Server 102 that are portable from one implementation to another, that is, the parts that do not depend on graphics hardware or input devices. The DIX 108 interprets the requests from the OS 106, manages event queues, distributes events to clients, manages the data structures visible to clients, and directs the other parts of the X-Server 102, including the Device Dependent layer (DDX) 110.

The DDX 110 encapsulates the X-Server 102 functions that depend on the capabilities of particular graphics and input devices. The DDX 110 initializes and manipulates pixmaps (dedicated offscreen memory), clipping regions, colormaps, screens, fonts, and graphic contexts. In addition, the DDX 110 collects input events from the keyboard and mouse and relays them back to the DIX 108. If a requested function involves a graphics operation, the DDX 110 reads/writes data to the Framebuffer 112.

The Framebuffer 112 represents video graphics memory. The DDX 110 draws a graphic image to the Framebuffer 112, after which, the graphics hardware reads the drawn image from the Frarnebuffer 112 and outputs the drawn image to a physical monitor. The DDX 110 reads from the Framebuffer 112 pixel information per a client's request, when moving windows and when saving portions of the framebuffer in offscreen memory.

FIG. 2 illustrates the present invention of an SLS X-Server 202 and the interaction of an SLS layer 204 with the original parts of an X-Server 102. The SLS layer 204 is a liaison between the DIX 108 and DDX 110 layers. Comparing FIGS. 1 and 2, the difference between a X-Server 102 and an SLS X-Server 202 in a multi-head configuration is readily apparent. An X-Server 102 is limited to one single DDX 110 that manages either multi-seat or multi-screen configurations such that windows cannot be moved across the physical monitors. In contrast, the SLS X-Server 202 manages multiple physical monitors, with multiple DDX's 206a–206n and Framebuffers 208a–208n, in which windows can move and span across the physical monitors. Each DDX 206a–206n and Framebuffer 208a–208n correspond to a specific graphics display of a physical monitor. For example, DDX 206a and Framebuffer 208a control the graphics operations of physical monitor 'a,' DDX 206b and Framebuffer 208b control the graphics operations of physical monitor 'b,' and continuing for each physical monitor 'a'–'n' in the network.

In operation, the SLS layer 204 is transparent to the user. Once the SLS X-Server 202 is initialized with the SLS configuration, a user creates and manipulates the SLS in a normal manner, such as using Xlib 104 functions directed to a single screen X-Server 102. The OS 106 reads the Xlib 104 request and sends the appropriate message to the DIX 108, thereby invoking a DIX 108 function, or request. The DIX 108, in turn, takes the request and executes the device independent parts of the request, if any. After which, the DIX 108 invokes a corresponding SLS layer 204 function, or request. The SLS layer 204 translates the SLS request into a low-level DDX 206a–206n function call for each physical monitor in the SLS configuration. That is, the SLS layer 204 loops through the number of physical monitors in the SLS configuration, 'a' through 'n,' and for each physical monitor, the SLS layer 204 invokes the corresponding DDX 206a–206n function. Therefore, each Xlib request for manipulating an SLS is translated to individual requests for each physical monitor in the SLS configuration. Each DDX 206a–206n function reads/writes data to the corresponding Framebuffer 208a–208n of each physical monitor.

The SLS layer 202 simply "plugs into" the X-Server 102 organization with no intrusive code in either the DIX 108 or DDX 110, thereby allowing the SLS layer 204 to be installed as a dynamically loaded driver and, if necessary, port to other operating systems with minimal effort.

The chosen embodiment of the present invention comprises computer software executing within a computer system. An exemplary computer system 302 is shown in FIG. 3. The computer system 302 includes one or more processors, such as a processor 304. The processor 304 is connected to a communication bus 306.

The computer system 302 also includes a main memory 308, preferably random access memory (RAM), and a secondary memory 310. The secondary memory 310 includes, for example, a hard disk drive 312 and/or a removable storage drive 314, representing a floppy disk drive, a magnetic tape drive, a compact disk drive, a program cartridge and cartridge interface (such as that found in video game devices), a removable memory chip (such as EPROM, or PROM), etc. which is read by and written to by removable storage unit 316. As will be appreciated, the removable storage unit 316 includes a computer usable storage medium having stored therein computer software and/or data. The removable storage drive 314 reads from and/or writes to a removable storage unit 316 in a well known manner.

Removable storage unit 316, also called a program storage device or a computer program product, represents a floppy disk, magnetic tape, compact disk, etc. As will be appreciated, the removable storage unit 316 includes a computer usable storage medium having stored therein computer software and/or data.

Computer programs (also called computer control logic) are stored in main memory 308 and/or the secondary memory 310. Such computer programs, when executed, enable the computer system 302 to perform the functions of the present invention as discussed herein. In particular, the computer programs, when executed, enable the processor 304 to perform the functions of the present invention. Accordingly, such computer programs represent controllers of the computer system 302.

In alternative embodiments, secondary memory 310 may include other similar means for allowing computer programs or other instructions to be loaded into computer system 302. Such means can include, for example, a communications interface 318. Communications interface 318 allows software and data to be transferred between computer system 302 and external devices. Examples of communications interface 318 can include a modem, a network interface (such as an Ethernet card), a communications port, etc. Software and data transferred via communications interface 318 are in the form of signals which can be electronic, electromagnetic, optical or other signals capable of being received by communications interface 318.

In this document, the term "computer program product" is used to generally refer to removable storage unit 316, a hard disk installed in hard disk drive 312, and signals 318. These computer program products are means for providing software to a computer system 302.

Computer programs (also called computer control logic) are stored in main memory 308 and/or secondary memory 310. Computer programs can also be received via communications interface 318. Such computer programs, when executed, enable the computer system 302 to perform the features of the present invention as discussed herein. In particular, the computer programs, when executed, enable the processor 304 to perform the features of the present invention. Accordingly, such computer programs represent controllers of the computer system 302.

In an embodiment where the invention is implemented using software, the software may be stored in a computer program product and loaded into computer system 302 using removable storage drive 314, hard disk drive 312, or communications interface 318. The control logic (software), when executed by the processor 304, causes the processor 304 to perform the functions of the invention described herein.

In another embodiment, the invention is implemented primarily in hardware using, for example, a hardware state machine. Implementation of the hardware state machine so as to perform the functions described herein will be apparent to persons skilled in the relevant arts.

The present invention is described in terms of a computer program executing within a computer system 302. More specifically, the invention is described in terms of incorporating an SLS layer 204 into the X Window system protocol which interfaces with the DIX 108 and multiple DDX's 206a–206n of a X-Server 102. The SLS layer 204 comprises data structures and functions written in the high level programming language C, and executed on a computer system comprising Hewlett-Packard Series 700 Graphics Workstations. For more information on X-Servers, see Israel and Fortune, *The X Window system Server*, X Version 11, Release 5, Digital Press 1992, which is incorporated herein by reference in its entirety. Description in these terms is provided for convenience only. It is not intended that the invention be limited to application in this example environment. In fact, after reading the following description, it will become apparent to a person skilled in the relevant art how to implement the invention in alternative environments.

The present invention is also described in terms of supporting the following Hewlett-Packard graphics displays: Dual CRX, Internal Color Graphics, Dual Color Graphics, CRX24, HCRX8, and HCRX24. The chosen embodiment of the present invention also requires an SLS configuration comprised of an arrangement of homogeneous physical monitors. That is, the physical monitors that make up an SLS must support the same level of display, functionality, and resolution. It is not intended that the invention be limited to application in this example environment. In fact, after reading the following description, it will become apparent to a person skilled in the relevant art how to implement the invention in alternative environments.

A. SLS Configuration

1. SLS Configuration of Physical Monitors

The SLS layer 204 of the SLS X-Server 202 introduces the concepts of the Sls Screen and Alternate Screens. For example in FIG. 4, suppose a user configures four (4) physical monitors 404–410 into a Single Logical Screen 402 matrix and wants to move and resize windows across each of the physical monitors, x0 404, x1 406, x2 408, and x3 410. The SLS layer 204 treats these as one large logical screen 402. This logical screen 402 is called the Sls Screen 402. The size of an Sls Screen 402 is the cumulative size of the physical monitors 404–410, such that the individual physical monitors 404–410 are called Alternate Screens 404–410. Thus, when a client issues a protocol request to an Sls Screen 402, the SLS Layer 204 propagates it to each of the Alternate Screens' 404–410 DDX Layers 206a–206n. A window never actually moves off of or on to an Sls Screen 402, but rather moves off of or on to an Alternate Screen 404–410.

Figure 5B:
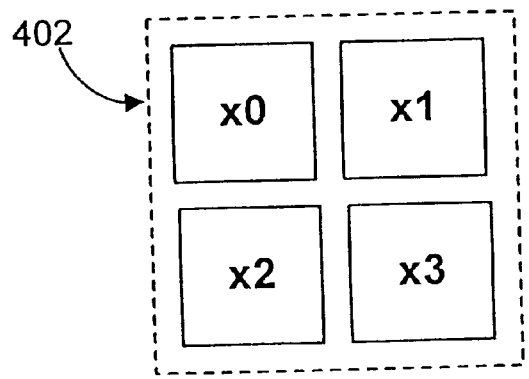
Figure 5C:
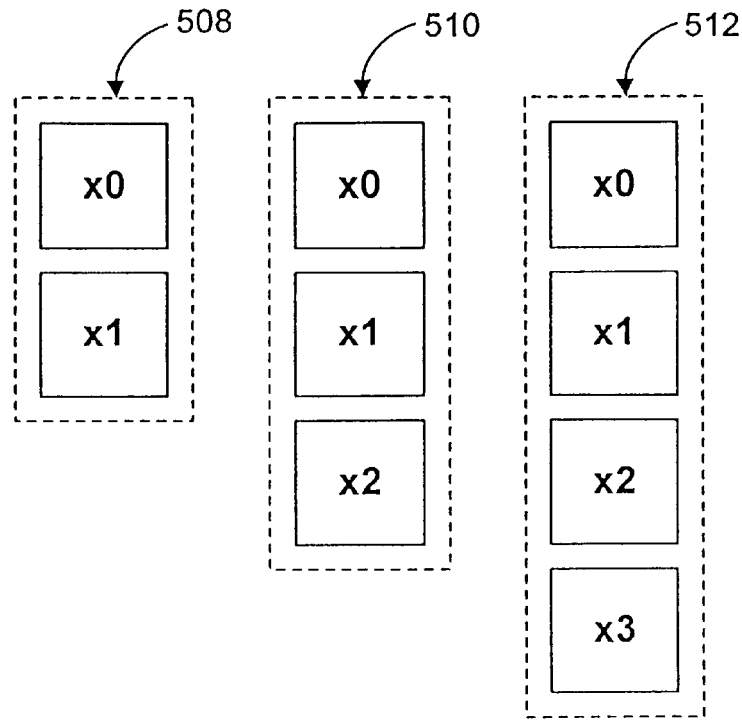
Figure 5D:
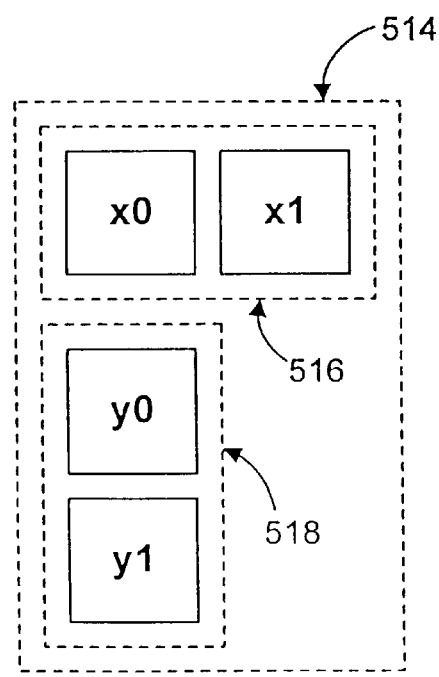

The SLS layer 204 supports all of the rectangular configurations illustrated in FIGS. 5(A)–(D). FIG. 5(A) illustrates a two (2) physical monitor horizontal configuration 502, a three (3) physical monitor horizontal configuration 504, and a four (4) physical monitor horizontal configuration 506. FIG. 5(B) illustrates a matrix configuration 402 comprising four (4) physical monitors. FIG. 5(C) illustrates a two (2) physical monitor vertical configuration 508, a three (3) physical monitor vertical configuration 510, and a four (4) physical monitor vertical configuration 512. FIG. 5(D) illustrates an 'L' shaped combination configuration 514 which the SLS layer 204 subdivides into a two (2) physical monitor horizontal configuration 516 and a two (2) physical monitor vertical configuration 518. In a combination configuration, such as the 'L' shaped combination configuration 514, a window cannot be moved or spanned across the two (2) physical monitor horizontal configuration 516 and the two (2) physical monitor vertical configuration 518. Other combination configurations are possible, such as a 'T' shaped combination configuration, wherein each combination configuration has a similar window restriction as the 'L' shaped combination configuration 514.

2. SLS Data Structures

The SLS layer 204 maintains the following Sls—specific information on an SLS Screen 402:

```
struct SlsRec
{
Int16 nSlsRows;
Int16 nSlsCols;
Int16 nAltScreens;
Int16 xOffset[MAXSCREENS];
Int16 yOffset[MAXSCREENS];
ScreenPtr pSlsScreen;
ScreenPtr pAltScreen[MAXSCREENS];
WindowPtr pSlsRootWindow;
WindowPtr pAltRootWindow[MAXSCREENS];
SlsVisualRec visualInfo;
SlsCmapInfoPtr pColormapInfo;
SlsMbxRec mbxInfo;
SlsLoaderInfoRec slsLoaderInfo;
} SlsRec, *SlsPtr;
```

The SLS layer 204 allows multiple instances of Sls to be active at any one time. For example, DIX 108 screen 0 could contain one SLS configuration and DIX 108 screen 1 could contain a second SLS configuration to form an 'L'-shaped configuration. To accomplish this, the SLS layer 204 maintains an array of SlsPtr's (SLS) with an index of the variable 'scr' which denotes a specific DIX 108 Sls Screen. In the following examples, 'scr' will denote a generic Sls Screen configuration.

The SLS X-Server 202 initializes the nSlsRows and nSlsCols fields during server startup and initialization. These fields define the configuration of the physical monitors that comprise a specific Sls Screen 'scr.' nSlsRows indicates the number of rows of the physical monitor configuration, and nSlsCols indicates the number of columns of the physical monitor configuration. For example, if a user configures a four (4) physical monitors vertical configuration 512, nSlsRows would contain the value '4', and nSlsCols would contain the value '1.' Further, if a user configures a four (4) physical monitors horizontal configuration 506, nSlsRows would contain the value '1', and nSlsCols would contain the value '4.'

The nSlsRows and nSlsCols fields are primarily used by the SLS layer's 204 input handling code to determine the configuration of the Alternate Screens and when windows are moved across screens. Input drivers, such as a pointing device, need to switch screens in a consistent fashion. Thus, if a user configures a vertical configuration, as shown in FIG. 5(C), the cursor only moves to a new Alternate Screen if the user moves it up or down. If the user configures a horizontal configuration, as shown in FIG. 5(A), now the cursor only moves to a new Alternate Screen if the user moves it left or right.

Another reason for maintaining information about the number of rows and columns is that when a user moves windows or copies window areas, the order that the SLS layer 204 processes the Alternate Screens can be determined by which direction the window is being moved. Referring to FIG. 4, the Alternate Screens x0 404, x1 406, x2 408, and x3 410 ordinarily would be processed in turn from x0 404 to x3 410, but when moving a window across the Sls Screen 402 from Alternate Screen x0 404 to Alternate Screen x3 410, the movement could look sporadic. The rendering of the windows, however, is usually so fast that the chosen embodiment of the present invention processes the Alternate Screens in turn. In an alternative implementation, to make the movement look natural, the window could be moved in Alternate Screen x0 404, then Alternate Screens x1 406 or x2 408 (order is relatively unimportant), and finally Alternate Screen x3 410. When moving a window from Alternate Screen x3 410 to Alternate Screen x1 406, there are two possible sequences for moving the window. First, the window could be moved in Alternate Screen x1 406, then Alternate Screens x3 410 or x0 404 (order is relatively unimportant), and finally Alternate Screen x2 408. Second, the window could be moved in Alternate Screen x1 406, then Alternate Screens x3 410 or x2 408 (order is relatively unimportant), and finally Alternate Screen x0 404.

The nAltScreens field of the SlsRec maintains the total number of Alternate Screens that comprise the Sls Screen. The nAltScreens value is derived from the number of rows (nSlsRows field) multiplied by the number of columns (nSlsCols field).

Figure 6:
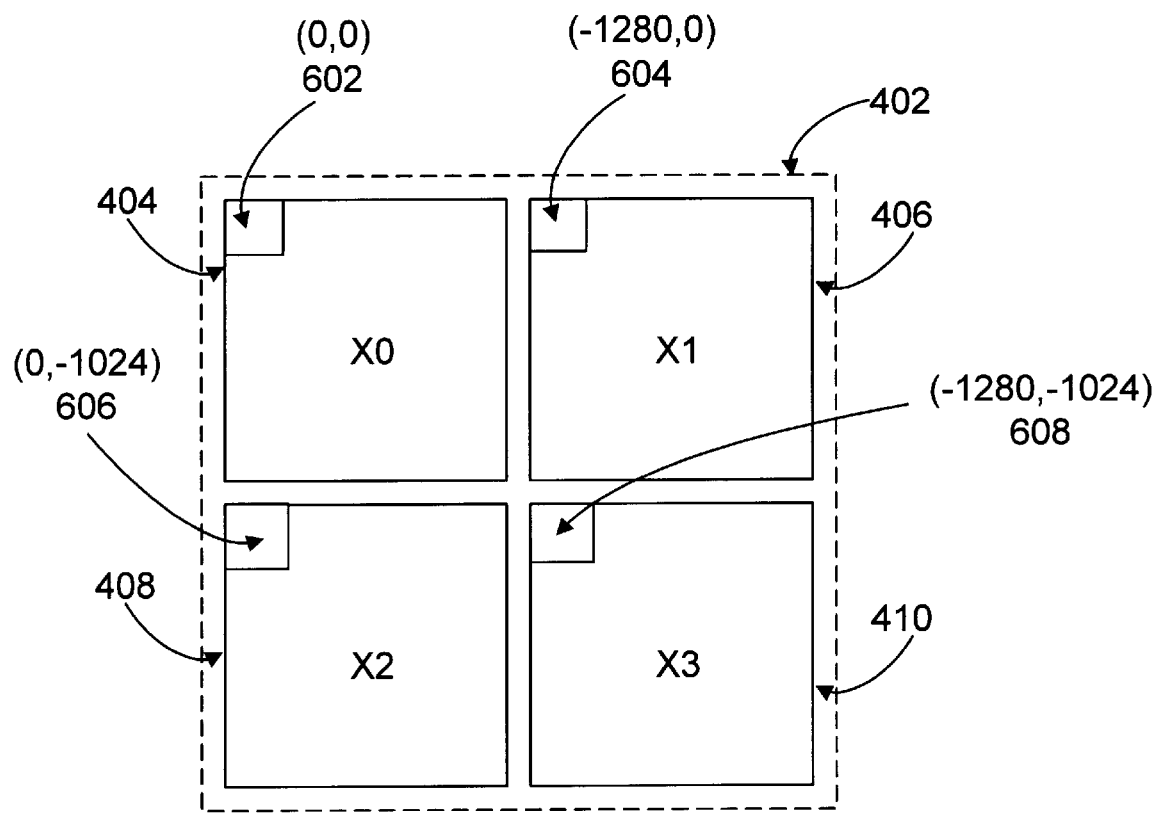
FIG. 6 illustrates x and y offset values of the physical monitors comprising an SLS.

The SlsRec fields, xOffset and yOffset, are one dimensional arrays, indexed by the number of Alternate Screens, that contain information on how to map a window's Sls Screen coordinates into normalized Alternate Screen coordinates. FIG. 6 illustrates a matrix configuration 402 and the offset values of each Alternate Screen 404–410, where each Alternate Screen is 1280×1024 pixels. Sls Screen 402 coordinates are derived from the top left corner 602 of the Sls Screen 402 which has an orientation of (0, 0). Therefore, Sls Screen 402 coordinates range from (0, 0) to (2560, 2048). Similarly, Alternate Screen 404–410 coordinates are derived from the top left corner of each Alternate Screen 404–410. Thus, an offset is needed for the top left corner of each Alternate Screen from the top left corner 602 of the Sls Screen 402, thereby providing an orientation of each Alternate Screen 404–410 within the Sls Screen 402 configuration. In FIG. 6, Alternate Screen x0 404 has an offset of (0, 0) because it corresponds to the origin, top left corner, of the Sls Screen 402; Alternate Screen x1 406 has an offset 604 of (−1280, 0); Alternate Screen x2 408 has an offset 606 of (0, −1024); Alternate Screen x3 410 has an offset 608 of (−1280, −1024). Therefore, the following macros may be used to map a window's Sls Screen coordinates into normalized Alternate Screen coordinates:

```
#define SLS_OFFSET_POINT (scr,i,x,y)\
    (x) += sls[(scr)]->xOffset[(i)];\
    (y) += sls[(scr)]->yOffset[(i)];
#define SLS_OFFSET_BOX (scr,i,box)\
    (box).x1 += sls[(scr)]->xOffset[(i)];\
    (box).y1 += sls[(scr)]->yOffset[(i)];\
```

-continued

```
(box).x2 += sls[(scr)]->xOffset[(i)];\
(box).y2 += sls [(scr)]->yOffset[(i)];
```

The following are sample calculations using the above macros:

| Macro Call | Result |
| --- | --- |
| SLS_OFFSET_POINT (1, 3, 1500, 1500)<br>x = 1500 + (−1280) = 220<br>y = 1500 + (−1024) = 476 | (220, 476) |
| SLS_OFFSET_POINT (1, 3, 1500, 200)<br>x = 1500 + (−1280) = 220<br>y = 200 + (−1024) = −874 | (220, −874) |
| SLS_OFFSET_POINT (1, 1, 2000, 100)<br>x = 2000 + (−1280) = 720<br>y = 100 + (−0) = 100 | (720, 100) |

The SLS layer 204 uses the offset values to provide users with the capability of generating a single simultaneous display (SSD) quickly and efficiently. An SSD is when all of the Alternate Screens of an SLS Screen display the contents of any one of the Alternate Screens. The way this happens is, the offset values (x and y) of all of the Alternate Screens are set to the offset values for a particular Alternate Screen (e.g. Alternate Screen 0). When rendering occurs, all screens show the exact same image because data is offset exactly the same for each Alternate Screen. This is useful for Demos or when a user is debugging software with someone else, in which case, both users can stare at the physical monitor closest to her. This is implemented via an extension to the X Server (called the SingleLogicalScreen Extension) which a user can invoke from the keyboard. The SLS Extension also allows dynamic changes to the SLS configuration. For example, if a user is currently in SLS mode and a person walks up to the user's desk to look at something on the monitor, the user can switch to SSD mode on the fly to display the same image on all of the monitors, thereby allowing the new person to view her own physical monitor and not strain to view the user's monitor. Then, when the person leaves, the user can just as easily switch back to SLS mode. The function call for changing to SSD mode is as follows

```
slsChangeMode (dpy, scr, altScreen);
where:  'dpy' =     display 'y',
        'scr' =     the specific X screen of the configuration in
                    multi-head configurations,
        'altScreen' = which Alternate Screen to display on the other
                    monitors.
```

The pSlsScreen and pAltScreen[MAXSCREENS] fields of the SlsRec structure are pointers to a ScreenRec data structure which is an X-Server 102 data structure that defines the fundamental characteristics of a screen. More specifically, pSlsScreen defines the characteristics of an Sls Screen, and pAltScreen[MAXSCREENS] is an array that defines the characteristics of each Alternate Screen. The ScreenRec structure contains two types of data fields: screen state information and pointers to functions the DIX 108 layer uses to manipulate the screens. In a conventional X-Server 102, the ScreenRec function pointers point to DDX 110 functions that the DIX 108 invokes to manipulate the screen. In the present invention for an SLS X-Server 202, however, the pSlsScreen pointers point to SLS functions. An SLS function translates a user request from an SLS function into multiple calls to DDX 206a–206n functions, such that there is one function call for each Alternate Screen. Pseudo code for the SLS functions is described below in detail. The DDX 206a–206n functions that are called by the SLS functions of the DIX 108 are pointed to by pAltScreen function pointers. Therefore, each pAltScreen function pointer, one per Alternate Screen, points to the DDX 206a–206n functions that actually perform the operations on that Alternate Screen. For a more detailed discussion on screens and the ScreenRec data structure, see Israel and Fortune, §2.3.2.

As discussed above, the SLS X-Server 202 allows for multiple Sls Screens, each of which comprises multiple Alternate Screens. Therefore, the following macros may be used to access the pointers to Sls and Alternate Screen functions:

```
extern SlsPtr *sls;
#define DIX_SCREEN(scr) screenInfo.screens[(scr)]
#define SLS_SCREEN(scr) sls[(scr)]->pSlsScreen
#define SLS_ALTERNATE_SCREEN(scr,i)
        sls[(scr)]->pAltScreen[(i)]
```

There are two window pointer fields in SlsRec : pSlsRootWindow and pAltRootWindow [MAXSCREENS]. These fields point to a WindowRec data structure which is an X-Server 102 data structure that defines the basic characteristics of a window on a particular screen. For a more detailed discussion on windows and the WindowRec data structure, see Israel and Fortune, §2.1.1. The pSlsRootWindow field is a pointer to the window tree for the Sls Screen, whereas the pAltRootWindow field is a pointer to the window trees for each of the Alternate Screens of the Sls Screen. Therefore, the following macros may be used:

```
#define DIX_WINDOW_TREE(scr) WindowTable[(scr)]
#define SLS_WINDOW_TREE(scr) sls[(scr)]->pSlsRootWindow
#define SLS_ALTERNATE_WINDOW_TREE(scr,i)
        sls[(scr)]->pAltRootWindow[(i)]
```

The VisualInfo field of the SlsRec data structure maps SLS visuals to alternate window visuals, wherein the visuals are further defined by an X-Server 102 data structure VisualRec. For a more detailed description of visuals and the VisualRec data structure, see Israel and Fortune, §2.2. The mapping is needed because windows are created with a specific visual ID. Since two (2) resources cannot share the same ID, the VisualInfo field maps an Sls Visual ID to each Alternate Visual ID, i.e. the same visual in each DDX 206a–206n layer. The VisualInfo field comprises the following data structure:

```
typedef struct_SlsVisualStruct
{
    visualPtr   pSlsVisual;
    visualPtr   pAltVisual[MAXSCREENS];
} SlsVisualRec, *SlsVisualPtr;
```

The pColormapInfo field of the SlsRec data structure maps the Alternate Screen 0's colormap identifiers to Sls Screen colormap identifiers. This field is based on the X-Server data structure Colormap. For more detailed description of colormaps and the Colormap data structure, see Israel and Fortune, §2.7. The pColormapInfo field is only used in the user function slsListInstalledColormaps, and maps the Alternate Colormap IDs to an Sls Colormap ID. The pColormapInfo field comprises the following data structure:

```
typedef struct_SlsColormapInfoStruct
{
    Int32    slsMid;
    Int32    altMid;
    struct_SlsColormapInfoStruct *next;
} SlsCmapInfoRec, * SlsCmapInfoPtr;
```

The mbxInfo field of the SlsRec data structure contains a mapping from Sls multi-buffering extension (MBX) buffer identifiers to Alternate Screen MBX buffer identifiers. Clients use the MBX for operations that must be performed within a given time frame. That is, clients can specify a series of buffers containing graphics images that must be shown in sequence. More detail on implementing extensions is provided below. The mbxInfo field comprises the following data structures:

```
typedef struct_SlsBufferIDStruct
{
    XID      id;
    Int32    altID[MAXSCREENS];
} SlsBufferIDRec; *SlsBufferIDPtr;
typedef struct_SlsMbxStruct
{
    SlsBufferIDPtr  pSlsMBXBufferIDs;
    Int32           nMBXBufferIDS;
} SlsMbxRec, *SlsMbxPtr;
```

The slsLoaderInfo field contains information relative to loading SLS as a dynamically loaded device on Hewlett-Packard systems. Once loading of the SLS X-Server 202 is complete, this structure is no longer used.

3. SLS Layer Interface (Wrapping and Unwrapping)

As discussed above, the SLS layer 204 of an SLS X-Server 202 plugs into a conventional X-Server 102 with no intrusive code in either the DIX 108 or DDX 206a–206n layers. Therefore, it is necessary to completely remove the SLS layer 204 from the system before calling into the DDX 206a–206n layer. Two macros perform the action of removing the SLS layer 204 from the system prior to calling the DDX 206a–206n layer, and re-installing the SLS layer 204 into the system when the call to the DDX 206a–206n layer finishes. The macros are:

```
#define SLS_INSTALL_ALT_SCREEN(scr,i)\
    DIX_SCREEN(scr) = SLS_ALTERNATE_SCREEN((scr,i));\
    DIX_WINDOW_TREE(scr) =
        SLS_ALTERNATE_WINDOW_TREE((scr,i));
#define SLS_INSTALL_SLS_SCREEN(scr)\
    DIX_SCREEN(scr) = SLS_SCREEN(scr);\
    DIX_WINDOW_TREE(scr) = SLS_WINDOW_TREE(scr);
```

The SLS_INSTALL_ALT_SCREEN macro replaces the DIX data structure screenInfo.screens[i] with Alternate Screen 'i,' whereas the SLS_INSTALL_SLS_SCREEN macro returns SLS to it's original wrapped state. The result is that the Sls Screen's function pointers will all point to SLS functions, and the Alternate Screen's function pointers will point to DDX 206a–206n functions. Therefore, the DIX 108 and DDX 206a–206n layers think that the current Alternate Screen is actually the only physical monitor. Additionally, the wrapping and unwrapping of function pointers is accomplished in two simple assignments each.

4. The Window Structure

As discussed above, the SLS layer 204 maintains multiple window trees, one for the Sls Screen and one for each Alternate Screen. One problem with maintaining multiple window trees is that when the DIX 108 calls through the SLS layer 204 to the DDX 206a–206n, it usually passes some sort of drawable pointer. If the DIX 108 passes a Pixmap pointer, the SLS layer 204 can choose any Alternate Screen to perform the modifications or rendering (unless the Pixmap is used for some type of client clipping, stippling, or tiling). However, if the DIX 108 passes a Window pointer, the SLS layer 204 must find its associated window in each of the Alternate Window Trees.

Figure 7:
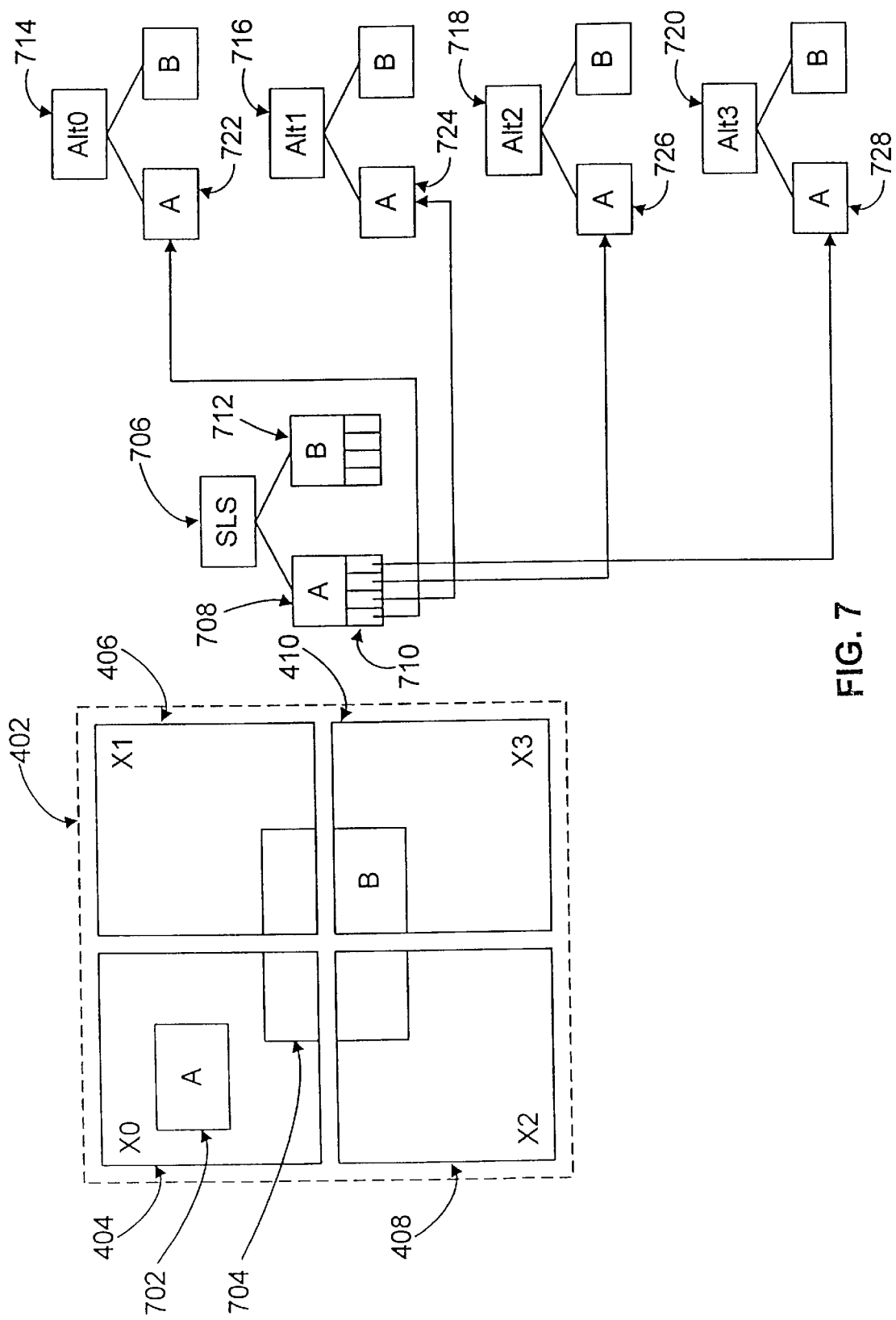
FIG. 7 illustrates connecting window trees.

This problem is solved by creating a window private structure for the Sls Window which points to its corresponding Alternate Windows. FIG. 7 illustrates these new pointers and how windows are connected across multiple Alternate Window Trees. The following data structure and macros are used to access these pointers:

```
typedef struct_SlsWindowPrivRec
{
    WindowPtr pAltWin[MAXSCREENS]; /* Alternate Windows kin to the
                                    * Sls Window           /*
} SlsWindowprivRec, * SlswindowPrivPtr;
#define SLS_WINDOW_PRIV_INDEX SlsWindowPrivIndex;
#define SLS_ALTERNATE_WINDOW(pWin, altScr)\
    ((pWin)->devPrivates[SLS_WINDOW_PRIV_INDEX].ptr)->
        pAltWin[(altScr)]
```

By using the previously defined macros, the body of most DIX 108 functions will take the following shape, an example of a simplified version of PositionWindow is illustrated:

```
Bool SlsPositionWindow (
    WindowPtr pSlsWin,
    Int32 x,
    Int32 y)
{
    WindowPtr  pAltWin;
    Int32      i,
        scr = pSlsWin->drawable.pScreen->myNum,
        xx, yy;
    for (i=0; i<SLS_NUM_SCREENS(scr);i++)
    {
        xx = x;
        yy = y;
        SLS_INSTALL_ALT_SCREEN(scr,i);
        pAltWin = SLS_ALTERNATE_WINDOW(pSlsWin, i);
        SLS_OFFSET_POINT (scr, i, xx, yy);
        (*DIX_SCREEN(scr)->PositionWindow)(pAltWin, xx, yy);
    }/*for */
    SLS_INSTALL_SLS_SCREEN(scr);
}/*slsPositionWindow*/
```

The window's new position point is offset from the Sls Screen coordinates to each Alternate Screen's coordinates because each Alternate Screen must display coordinates (0, 0) to (1380, 1024). Therefore, instead of placing the window at Sls Screen coordinates (x, y) and adjusting clipLists, the window is positioned in each Alternate Screen which could be an off screen location, such that any portions of the window that lie in the Alternate Screen (range (0, 0)→(1280, 1024)) region appear.

5. The Graphics Context (GC) Structure

The GC is another structure that is created, manipulated, and destroyed by the DIX 108 layer, but has ramifications in the SLS 204 and DDX 206a–206n layers. The GC structure contains all of the state information the DDX 206a–206n layer needs for implementing the different graphics requests, as well as pointers to the routines that actually perform the various graphics operations. For more information on the GC structure, see Israel and Fortune, §2.5. The DIX 108 creates one Sls GC data structure as well as one GC data structure for each Alternate Screen, called Alternate GC Structures. When a GC operation is requested by DIX 108, the operation must be preformed with all of the Alternate GCs. The chosen embodiment uses the devPrivates field to form an array of associated alternate GCs. Therefore, the following data structure and macros can be used to find the Alternate GCs for the Sls GC:

```
typedef_SlsGCPrivRec
{
GCPtr    pAltGC[MAXSCREENS];   /* Alternate GCs kin to the
                                * Sls GC                  */
Int32    altScr;               /* If this GC takes the Fast Ops
                                * Table, this is the index of
                                * the Alternate screen that the
                                * window is on.           */
} SlsGCPrivRec, *SlsGCPrivPtr;
#define SLS_GC_PRIV_INDEX SlsGcPrivIndex
#define SLS_GC_PRIV(pGC)\
       ((SlsGCPrivPtr)((pGC)->
           devPrivates[SLS_GC_PRIV_INDEX].ptr))
#define SLS_ALTERNATE_GC(pSlsGC, altScr)\
       ((GCPtr)(SLS_GC_PRIV(pSlsGC))->
           pAltGC[(altScr)]))
#define SLS_GC_FAST_ALT_SCREEN(pSlsGC)\
       (Int32)(SLS_GC_PRIV(pSlsGC))->altScr)
```

The GC structure contains fields that must be identical across the Sls GC and all of the Alternate GCs to ensure that the field values are the same. These fields are:

i) depth, alu;

ii) lineWidth, lineStyle, capStyle, joinStyle;

iii) dashOffset, numInDashList, dash;

iv) fillStyle, fillRule;

v) arcMode;

vi) subWindowMode;

vii) graphics Exposures, clientCliptype, miTranslate (although the HW drivers modify these parameters, the values need to be identical until the call to the DDX 206a–206n layer is made);

viii) tileIsPixmap, planemask, patOrg;

ix) fgpixel, bgPixel;

x) font; and xi) stateChanges, serialNumber.

6. The Colormap Structure

Like the GC structure, colormap structures must be created, manipulated, and destroyed across the DIX 108, SLS 204, and DDX 206a–206n layers. The colormap structure defines a single colormap for each screen. For more information on the colormap structure, see Israel and Fortune, §2.7. The colormap created by DIX 108 is called the Sls Colormap, and the associated colormaps created by the SLS layer 204 are called the Alternate Colormaps. Once again, when DIX 108 manipulates the Sls Colormap, SLS needs to proliferate the change throughout the list of Alternate Colormaps. Every field in the colormap structure must be kept identical between the Alternate Colormaps. The following data structure and macros can be used for the Sls and Alternate Colormaps:

```
typedef struct_SlsColormapInfoStruct
{
    Int32    slsMid;
    Int32    altMid;
    struct_SlsColormapInfoStruct *next;
} SlsCmapInfoRec, *SlsCmapInfoPtr;
#define SLS_COLORMAP_PRIV(pCmap)\
       (pCmap)->devPriv
#define SLS_ALTERNATE_CMAP (pSlsCmap, altScr)\
       ((S1sCmapPrivPtr)(SLS_COLORMAP_PRIV(pSlsCmap)))->
           pAltCmap[(altScr)]
```

B. Screen Operations

The chosen embodiment of the present invention centers on the implementation of a single Sls Screen and multiple Alternate Screens. The SLS layer 204 consumes only one entry in the DIX screenInfo and WindowTable data structures and represents the entire logical screen. When the SLS layer 204 is wrapped and unwrapped from the SLS X-Server during any screen, window, GC, or colormap operation, a specified Alternate Screen completely replaces the DIX screenInfo entry (which is originally the Sls Screen). In operation, when a user requests a window operation on an Sls Screen, the DDX 206a–206n layer invokes the corresponding SLS function. The SLS function will iteratively invoke the corresponding DDX 206a–206n function for each Alternate Screen. Thus, each call to an SLS function translates into a DDX 206a–206n call to each Alternate Screen. FIGS. 8(A)–(F) illustrate the wrapping and unwrapping of the SLS layer 204.

Figure 8D:
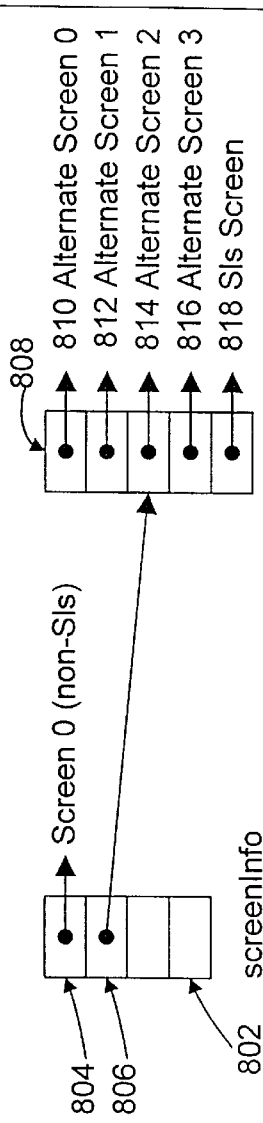
Figure 8E:
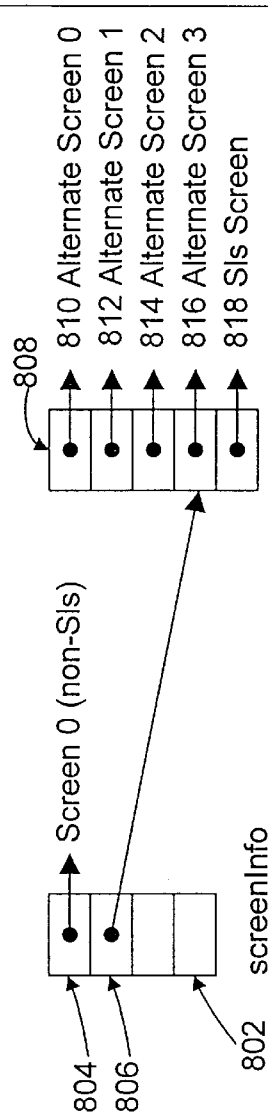
Figure 8F:
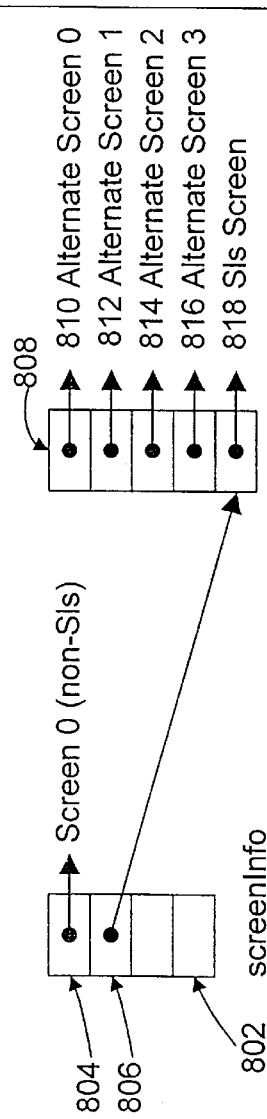

In FIG. 8(A), the SLS layer 204 is located in only one entry in the DIX screeninfo 802, called the SLS entry 806. The DIX screenInfo 802 comprises multiple entries, each of which may be an SLS configuration or a non-SLS configuration such as DIX Screen 0 804. The SLS X-Server 202 executes equally as well in both SLS and non-SLS configurations. Referring again to FIG. 8(A), the SLS entry 806 points to the list of SLS functions 818 that manipulate all of the Alternate Screens of an Sls Screen for each SLS function. When a user invokes an Xlib function, the DIX 108 layer invokes the corresponding SLS function from the list of SLS functions 818. The corresponding SLS function calls the DDX 206a–206n for each Alternate Screen with the corresponding DDX 206a–206n function. Thus, the SLS function unwraps the SLS layer 204 and installs the first Alternate Screen as shown in FIG. 8(B). The screeninfo pointer now points to the DDX 206a–206n functions that correspond to the first Alternate Screen, Alternate Screen 0 810. Thus, the first Alternate Screen gets updated according to the DDX 206a–206n function 810. Continuing to FIG. 8(C), the SLS function advances the screeninfo pointer to the DDX 206a–206n functions that correspond to the second Alternate Screen, Alternate Screen 1 812. The SLS function continues through all of the Alternate Screens, as shown in FIGS. 8(D)–8(E). After all of the Alternate Screens have been updated with the corresponding DDX 206(a)–206(b) function, the SLS function wraps the SLS layer 204 by reinstalling the SLS functions 818 into the DIX 108 screenInfo 806. FIG. 8(F) illustrates this wrapping, thus returning to the initial configuration of FIG. 8(A).

Not only does this mechanism provide an easy way to wrap and unwrap the Sls Screen and Alternate Screen member functions, it does so in an extremely efficient manner. Further, each Alternate Screen will think that it is actually physical screen 1 806 (see FIGS. 8(A)–(F)), so the actual DDX 206a–206n layer requires no code changes to support the Sls layer 204.

The following pseudo code illustrates the translation of a X screen protocol function request through a single logical screen:

```
Client:          /* The client invokes an Xlib 104 function request */
                 XCreateWindow (Dpy, Parent, x, y, width, height, border-width,
                 depth, class, visual, valuemask, attributes);
OS 106 layer:    Reads the request and sends the appropriate message to
                 the DIX 108.
                 Calls => ProcCreateWindow;
DIX 108 layer:   /* Bookkeeping for the server */
                 Reads ProcCreateWindow and calls => CreateWindow;
DIX 108 layer:   /* DIX 108 takes the function and creates the device
                 independent parts of the window */
                 Reads CreateWindow and calls => SlsCreateWindow;
SLS layer 204:   /* SLS layer 204 takes information from the DIX 108
                 and replicates it 'n' times, where 'n' = the number of
                 Alternate Screens, and calls the DDX 206a–206n 'n'
                 times to configure the Alternate Screens. */
                 Reads SlsCreateWindow:
                     for (i=0; i<nAltScreens;i++)
                     {
                         Do everything DIX:CreateWindow did for Alternate
                             Window 'i'
                         Install Alternate Screen 'i'
                         Call ddxCreateWindow for Alternate Screen 'i'
                     }
DDX 206a–206n layer:  /* DDX 206a–206n configures the device
                      dependent aspects of an Alternate Screen. It is
                      called once per Alternate Screen. */
                      Read and process ddxCreateWindow
```

The following lists the screen member functions that ordinarily would not need to be wrapped and unwrapped, but can deal directly with the Sls Screen.

i) QueryBestSize;

ii) CreatePixmap, DestroyPixmap;

iii) ConstrainCursor, Cursor Limits, DisplayCursor, RealizeCursor, UnrealizeCursor, RecolorCursor, SetCursorPosition, PointerNonInterestBox; and iv) RegionCreate, RegionInit, RegionCopy, RegionDestroy, RegionUninit, Intersect, Union, Subtract, Inverse, RegionReset, TranslateRegion, RectIn, PointInRectangle, RegionNotEmpty, RegionEmpty, RegionExtents, RegionAppend, RegionValidate, BitmapToRegion, RectsToRegion.

The following lists the screen member functions that will need to be accepted by the Sls Screen and distributed to the Alternate Screens:

i) CloseScreen, SaveScreen;

ii) GetImage, GetSpans;

iii) SourceValidate;

iv) CreateWindow, DestroyWindow, PositionWindow, ChangeWindowAttributes, RealizeWindow, UnrealizeWindow, ValidateTree, PostValidateTree, WindowExposures, CopyWindow, ClearToBackground, ClipNotify;

v) SaveDoomedAreas, RestoreAreas, ExposeCopy, TranslateBackingStore, ClearBackingStore, DrawGuarantee;

vi) RealizeFont, UnrealizeFont;

ii) CreateGC;

viii) CreateColormap, DestroyColormap, InstallColormap, UninstallColormap, ListInstalledColormaps, StoreColors, ResolveColors;

ix) BlockHandler, WakeupHandler; and x) CreateScreenResources.

C. Window Operations

Figure 9:
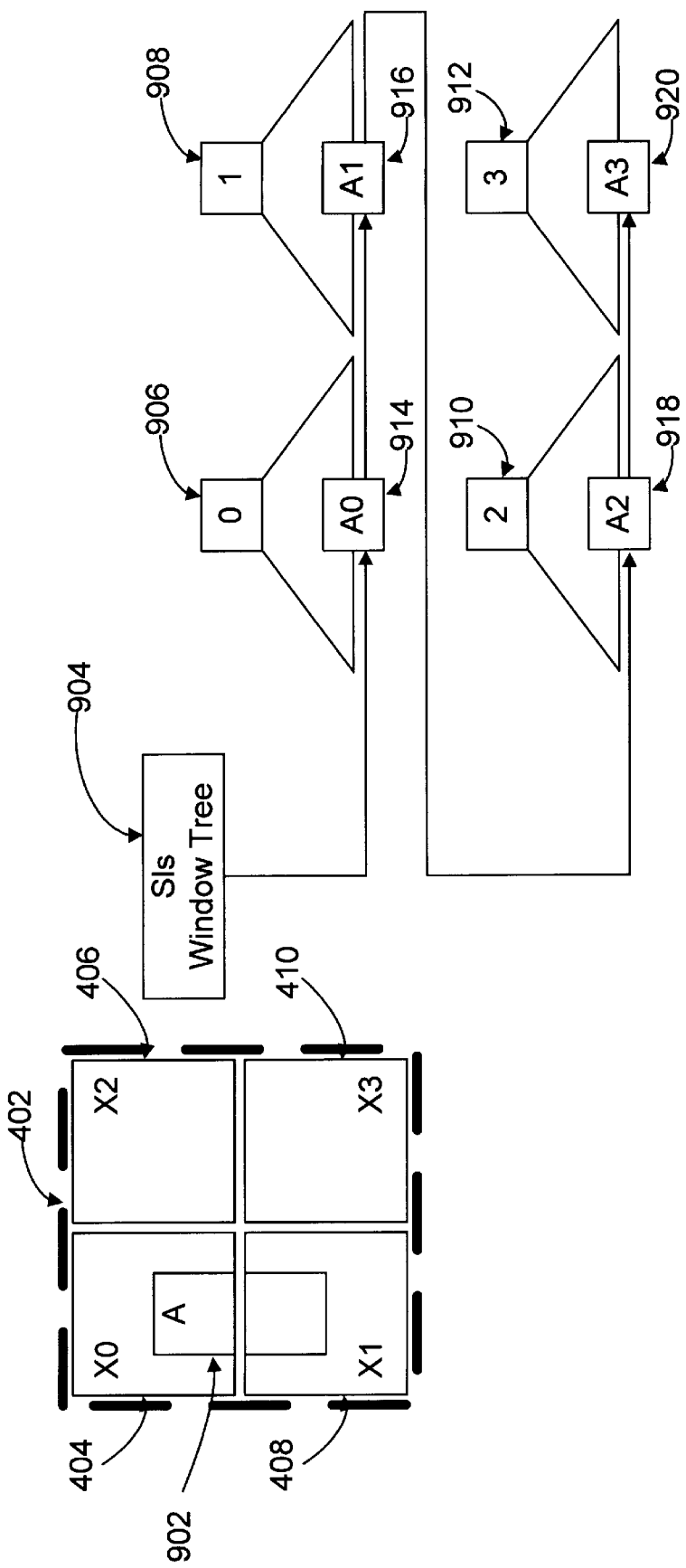
FIG. 9 illustrates linked kin windows.

The SLS layer 204 maintains multiple window trees, one for each Alternate Screen, as discussed above. The term kin window refers to the same logical window in a different Alternate Window Tree. For example, in FIG. 9, windows AO 914, A1 916, A2 918, and A3 920 are all kin. FIG. 9 shows four Alternate Window Trees (0 906, 1 908, 2 910, and 3 912), each of which has one child, window A (AO 914, A1 916, A2 918, and A3 920). FIG. 9 also illustrates the mechanism linking the kin windows. The SLS layer 204 maintains a window tree for each Alternate Screen, thereby creating an identical window $A_i$, where i=(0 . . . num Sls Screens–1) for Alternate Window Tree 'i.' These "identical" windows need to be accessible from each other. Thus, the SLS layer 204 uses a window private structure to point to the kin window in the next Alternate Window Tree. The result is shown in FIG. 9 in which the Sls Window Tree 904 maintains the characteristics of the windows on the Sls Screen 402, and includes a pointer to the list of kin windows in each of the Alternate Window Trees, A0 914, A1 916, A2 918, and A3 920.

Synchronization of the Sls Window Tree with the Alternate Window Trees is imperative to ensure correct window operations. However, the DIX 108 changes quite a few of a window's data structure values without invoking the DDX 206a–206n layer. For example, the DIX 108 function MapWindow sets the mapped field to True without a call to the DDX 206a–206n layer. In such a case, the DDX 206a–206n layer will not know when to update the Alternate Window Trees. Therefore, synchronization is necessary at specific checkpoints during server execution to ensure window tree integrity.

One approach for handling window tree synchronization is to modify the DIX 108 code to call the helper functions (e.g. MapWindow) through function pointers. This approach is implemented in version 11, release 6 (X1 1R6) of the Hewlett-Packard X-Server. Helper functions help to initialize, allocate, and maintain data structures. These functions typically accept arguments that correspond to fields in data structures, and perform a specific operation on a specific data structure. In this approach, the SLS layer 204 wraps the helper functions which introduces limited modifications to DIX 108 code. In addition, the Alternate Window Trees are kept in lockstep.

An alternate approach introduces the concept of SLS Checkpoints. A checkpoint is a timely validation of the SLS data structures that maintain Alternate Window Tree, GC, and Colormap integrity. Similar to the Validate Tree and ValidateGC functions, the SLS validations of the Window, GC, and Colormap data structures are placed in strategic locations of the code to minimize impacts to performance but maximize the time during which the Alternate data structures are identical to the SLS data structures. It is essential that the SLS and Alternate data structures agree.

A disadvantage with the Checkpoint approach is the extensive overhead. For the checkpoint approach to be effective, the integrity of the Alternate Window Trees must be checked. This check involves ensuring the windows' attributes in each Alternate Window Tree are identical (i.e. mapped, realized, etc) as well as verifing the family tree for each window. In other words, do two kin windows have the same kin parent? Same children? Same siblings? These checks can all be performed during an SLS layer 204 function call to PositionWindow, RealizeWindow, and ValidateTree.

The chosen embodiment of the present invention implements this approach which involves calling all of the DIX 108 functions through function pointers, such as MapWindow, MarkOverlappedWindows, etc. The DIX 108 calls DDX 206a–206n functions through function pointers in the ScreenRec structure. With this approach, the SLS layer 204 has already wrapped these function pointers.

D. GC Operations

GC operations are similar to the window and screen operations discussed above in that the SLS layer 204 needs to intercept all GC operations, then pass them on to the Alternate Screens. The difference lies in the mechanisms used to actually perform the wrapping and unwrapping. Further, the GC contains two sets of function pointers, Funcs and Ops, that needs to be wrapped and unwrapped.

As with Alternate Window Trees, the Alternate GCs must be accessible from the Sls GC data structure that is visible to the DIX 108 and from the Sls GC that is visible to the clients. GCs, however, are not maintained in some type of easily accessible tree structure as windows. Therefore, the SLS layer 204 uses the devPrivates field of the GC structures to link the Sls GC data structure to the Alternate GCs data structures. This is initialized during the DIX 108 call to CreateGC and is structurally identical to the linking of window trees discussed above. Similar to kin windows, the term kin GCs describes Alternate GC structures that are linked together.

1. GC Funcs

Wrapping the GC Funcs table is slightly more complicated than wrapping window operations. A GC is not fullly initialized until it is validated. GC Validation is the process by which the GC attributes are inspected and changes are made to the GC Ops table based upon GC attributes so that the desired rendering actually takes place. Thus, the SLS layer 204 can install Cheap Functions as initial wrappers for the GC Funcs table. Cheap Functions do not perform complicated wrapping and unwrapping of the GC Ops table because the GC has yet to be validated. After the ValidateGC routine performs the validation, it installs Expensive Functions, which in turn wrap and unwrap both the GC Funcs and GC Ops tables.

Like the window operations wrapped by the ScreenRec, the Sls GC's Funcs table has its function pointers pointing to SLS functions (i.e. SlsValidateGC), while the pointers to the originally installed GC functions will reside in the Alternate GC structures. Thus, unwrapping is accomplished by installing the Alternate GC functions associated with the current Alternate Screen, and wrapping is accomplished by installing the Sls GC function corresponding to the Sls Screen.

The functions included in the GC Funcs table include:
i) ValidateGC;
ii) ChangeGC;
iii) CopyGC;
iv) DestroyGC; and
v) ChangeClip, DestroyClip, CopyClip.

2. GCOps

GC Ops are also known as the rendering routines because they call to the DDX 206a–206n layer and actually perform the rendering of a graphics image to a physical monitor. Typical GC Ops functions include Polylines, PolyText8, etc. As described above for GC Funcs, these functions are wrapped each time the DIX 108 layer calls ValidateGC. As far as the SLS layer 204 is concerned, the wrapping of the GC Ops table is transparent. This is because a drawable image in each of the Alternate Window Trees is validated against the corresponding Alternate GC structure. For example, if the SLS configuration is heterogeneous, the GC Ops tables in each of the kin Alternate GC structures will likely be different.

Sometimes the DDX 206a–206n layer modifies the data passed to it. This is a problem for the SLS layer 204 because it wants to pass the same set of data to each of the Alternate Screen's routines. Thus, the SLS layer 204 makes a copy of this data, then invokes the function 'memcpy' to copy the data each time it calls to a new Alternate Screen's DDX 206a–206n layer. One disadvantage of this implementation is that it is quite slow. Therefore, for each of the primitive operations, the SLS layer 204 maintains a pool of data. The first time a primitive is called, the fimction allocates either the number of data points passed in by the DIX 108 or ten (10) elements, which ever is more. Then, instead of allocating and freeing the data for each call to a primitive operation, the data only needs to be reallocated if the SLS layer 204 needs to grow the data pool.

The functions included in the GC Ops table include:
i) FillSpans, SetSpans;
ii) PutImage;
iii) CopyArea, CopyPlane;
iv) PolyPoint, Polylines, PolySegment, PolyRectangle, PolyArc, PolyFillRect, PolyFillArc;
v) FillPolygon;
vi) PolyText8, PolyText16, ImageText8, ImageText16;
vii) ImageGlyphBlt, PolyGlyphBlt; and
viii) PushPixels, LineHelper.

It turns out that if a window (not a Pixmap) is fully contained within one of the Alternate Screens and the SLS X-Server 202 is NOT in SSD mode, the SLS layer 204 can use a smart set of GC Ops, called GC Fast Ops. During GC Validation it is possible to determine if the drawable image is a window and is fully contained within one of the Alternate Screens. If it is, the SLS layer 204 saves away the index of the Alternate Screen that completely contains the window as well as a pointer to the window. Then, the Fast Ops table can be plugged in. Instead of cycling through the Alternate Screens to find the Alternate GC's, Alternate drawable's, etc, that contains the window, the SLS layer 204 simply installs the correct Alternate Screen and makes the call to the DDX 206a–206n Layer.

E. Colormap/Visual Operations

When the SLS layer 204 is initialized, each root window is created with the same visual and created with an identical default colormap. Once agaln, the SLS layer 204 implements the idea of an Sls Colormap and Alternate Colormaps. The Alternate Colormaps are also linked to form a list of kin colormaps.

The SLS layer 204 manipulates Colormaps similar to CGs. In other words, the SLS layer 204 intercepts each colormap request that the DIX 108 dispatches, and subsequently dispatches that request to the Sls Colormap and each of the Alternate Colormaps. A problem, however, with colormaps lies in the concept of the default colormap. It is necessary to guarantee that the default colormaps for each of the Alternate Screens are identical (i.e., are of the same visual, cells contain identical values, etc.). This problem is dealt with at server initialization time when the SLS layer 204 determines the Greatest Common Denominator (GCD) of the SLS configuration. As far as colormaps are concerned, the GCD function will find common values (the maximum set that is supported on each of the Alternate Screens) of the following fields from the ScreenRec:

i) numDepths, rootdepth, allowedDepths;
ii) defColormap, minInstalledCmaps, maxInstalledCmaps; and
iii) whitePixel, blackPixel.

The SLS layer 204 uses these values to initialize a GCD configuration. For instance, if Alternate Screen 0 can support four (4) depths but Alternate Screen 1 can only support two (2) depths, the SLS layer 204 finds the first two common depths and store them in the allowedDepths field. Then, the SLS layer 204 sets numDepths to two (2). The rootDepth is set depending upon the listed allowedDepths. A more detailed description of the SLS X-Server 202 initialization and the GCD determination is provided below.

Unlike window and GC operations, the ColormapRec structure for defining colormaps does not use a devPrivates field. Therefore, the window and GC approach for linking Alternate GCs is not possible. Instead, colormaps use what is called the devPriv field which is simply a pointer.

Therefore, the SLS layer 204 needs to create and manage information for linking the Sls Colormaps with the Alternate Colormaps. When a colormap is created, the SLS layer 204 uses the devPriv field of the colormap structure to point to the Alternate Colormaps. The SLS layer 204 stores pointers to the Alternate Colormaps in a linked list data structure.

A Colormap Mapping Table, pColormapInfo, links the Colormap IDs of an Sls Screen to the Colormap IDs of Alternate Screen 0. The reason this table exists is because of the screen function ListInstalledColormaps. The SLS version of this function calls to the DDX 206a–206n layer asking for the colormaps installed on Alternate Screen 0. If the DIX 108 layer uses the colormaps installed for Alternate Screen 0, the DIX 108 layer will be totally confused because it only knows about the Colormaps for the Sls Screen. Therefore, the pColormapInfo list contains a list of all of the SLS Colormaps currently active with a mapping to the Alternate Colormap on Alternate Screen 0.

There are many vendor specific colormap properties posted to the Root Window of a conventional X Server 102. These properties exist on all of the Alternate Root Windows in an SLS configuration and need to appear in the SLS Root Window. After creating the Alternate Root Windows, the SLS layer 204 adds all of the properties of the Alternate Root Windows to the SLS Root Window. Adding properties can be quite tedious because all of the original work of posting occurred at the DDX 206a–206n layer. Therefore, if any pixmaps or colormaps were created, the SLS layer 204 needs to re-create those colormaps so that it can associate the new Alternate Pixmaps or Colormaps with them.

During SLS X-Server 202 initialization, the SLS layer 204 needs to determine what set of visuals is supported on each Alternate Screen and make sure the Sls Screen reflects the GCD set of those visuals. This is because the DIX 108 layer reports the values held within the Sls Screen to clients, so only supported visuals are available to the client.

During the Greatest Common Denominator phase of server initialization, the SLS layer 204 may encounter the case where there are no common visuals supported on some of the Alternate Screens. For example, if the user specified a Grayscale Device and a Color Device, there are no common visuals. This is considered an incompatible configuration and forces the SLS layer 204 to revert to a single, non-SLS configuration.

Whenever a colormap is created, the SLS layer 204 must know with which visual it should be created. For example, the SLS Colormap is created with the SLS Visual. However, the SLS Visual ID may or may not be valid for a particular Alternate Screen. More specifically, the list of SLS Visual IDs is identical to that of Alternate Screen 0, but none of the other Alternate Screens. This, of course, assumes a homogeneous configuration of physical monitors. Therefore, a mapping is needed from SLS Visuals to associated Alternate Visuals. This mapping exists in the SlsRec as visualinfo. When a colormap, or window, is created, the SLS layer 204 looks up the SLS Visual ID and determines what the Visual should be for the current Alternate Screen.

F. Input

Input processing is one of the most important issues facing the SLS X-Server 202. The reason is that if the pointer does not move across the physical monitors of the Sls Screen in a consistent manner, the user may become frustrated. For example, in the Matrix Configuration 402 illustrated in FIG. 4, the cursor needs to move within the entire matrix of the four (4) physical monitors. The cursor should move up/down when appropriate to change screens between Alternate Screen x0 404 and Alternate Screen x2 408, and Alternate Screen x1 406 and Alternate Scree x3 410, and left/right to change the screen between Alternate Screen x0 404 and Alternate Screen x1 406, and Alternate Screen x2 408 and Alternate Screen x3 410. The SLS layer 204 wraps calls to ConstrainCursor, CursorLimits, DisplayCursor, RealizeCursor, UnrealizeCursor, RecolorCursor, and SetCursorPosition. Therefore, the SLS layer 204 keeps track of which Alternate Screen 404–410 would have the focus if the Sls Screen 402 were active, display the cursor in an appropriate fashion (e.g., if it straddles multiple Alternate Screens), and move the cursor around the Sls Screen 402.

To maintain the look and feel of a Single Logical Screen, the SLS layer 402 allows the cursor to appear on multiple physical monitors at one time if it straddles multiple physical monitors. This is accomplished by displaying the cursors on all physical monitors that are within some distance of the next Alternate Screen. This is called the cursor sensitivity.

G. Event Handling

Each window in the Sls Window Tree and each Alternate Window Tree perform all of a user's requested options. This includes the sending of events directly to the client. These events take two forms: notification events and computational events.

1. Notification Events

Figure 10:
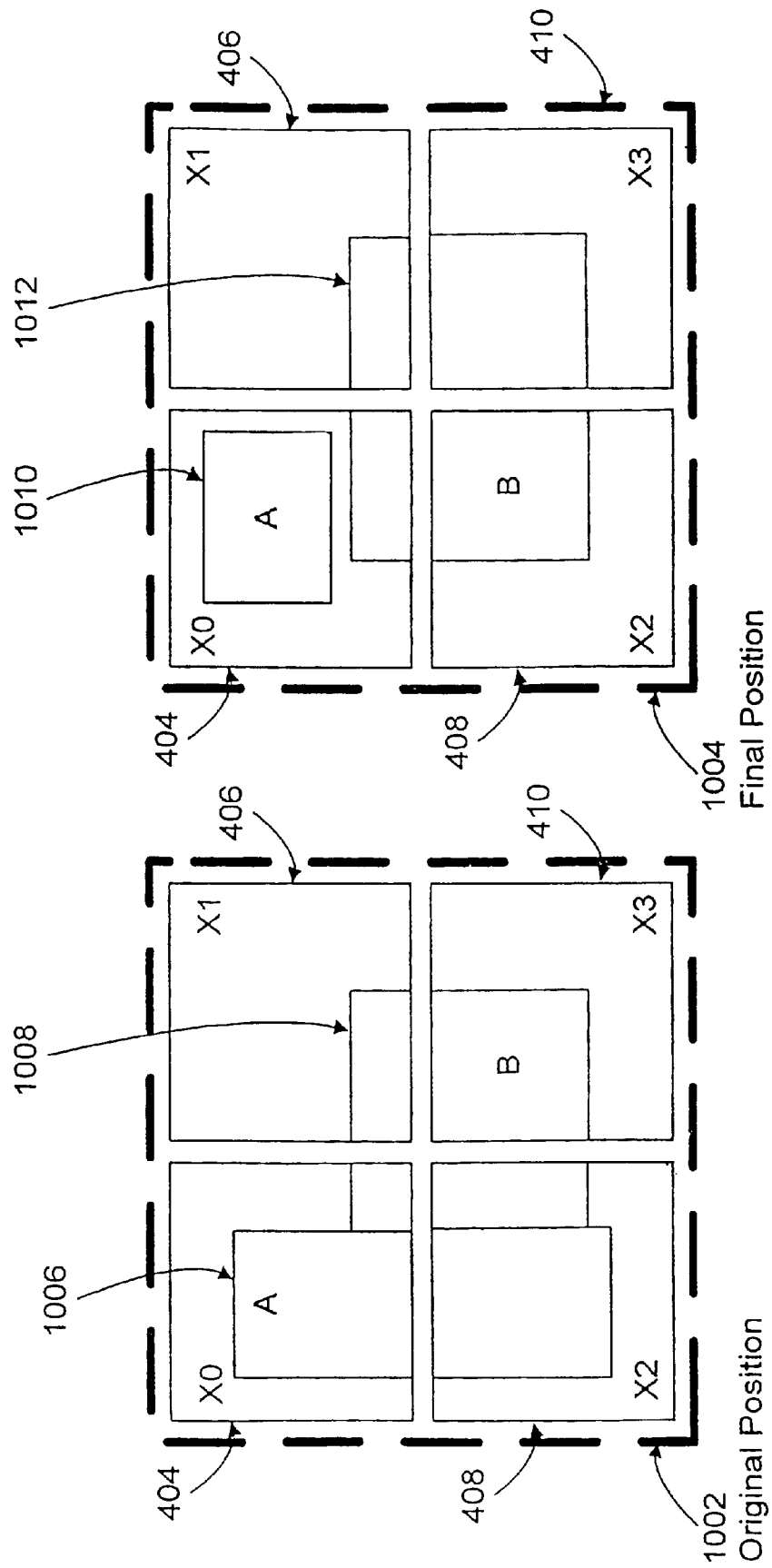
FIG. 10 illustrates expose events.

These events are sent to requesting clients when certain actions occur. For example, if a window is visible on the Sls Screen, if interested, a client receives a VisibilityNotify event. The problem with notification events stems from having multiple Alternate Screens that a window may be mapped to. FIG. 10 illustrates this problem. Referring to the original position of the Sls Screen 1002, the first Alternate Screen x0 404 tells the client that window A 1006 is partially visible. Alternate Screen x1 406 tells the client that window A 1006 is not visible, but is fully obscured, hence the client will discontinue rendering to the window A 1006. Alternate Screen x2 408 tells the client that window A 1006 is partially visible again, so the client will once again render to window A 1006. Finally, Alternate Screen x3 410 tells the client that window A 1006 is not visible, so the client once again discontinues rendering to window A 1006. However, window A 1006 is fully visible, not partially visible, on the Sls Screen 1002.

2. Computational Events

Computational Events return some region to the client that must be dealt with in some manner. For example, Expose events return to the client a region that was previously obscured, but has become unobscured and must be repainted. FIG. 10 illustrates Expose events. In the original position of the Sls Screen 1002, window A 1006 is partially obscuring window B 1008 in Alternate Screens x0 404 and x2 408. Next, assume that a user repositions the windows on the Sls Screen 1002 such that window A 1006 and window B 1008 move from the original position 1002 to a final position 1004. In the final position of the SLS X-Server 202, the server sends events in the following manner as shown in Table 1:

TABLE 1

| Alternate Screen | Exposed Region |
| --- | --- |
| 0 | 200,800,200,200 |
| 1 | nil |
| 2 | 200,0,200,400 |
| 3 | nil |

As it turns out, this is probably okay for a client. The client will repaint the regions in a piecemeal fashion instead of being able to issue a single request In other words, the actual region that should be exposed is (200, 800, 200, 600), but was split between the Alternate Screens x0 404 and x2 408.

To accommodate both Notification and Computational Events, the SLS layer 204 adds two functions to the Screen-Rec Structure: DeliverEvents and MaybeDeliverEventsTo-Client. These two functions are added because they are the main functions called from the DIX 108 and DDX 206a–206n layers to deliver events to clients. In an effort to not break third parties, they are implemented as follows: Just after calling AddScreen during SLS X-Server 202 initialization, the SLS layer 204 sets two new function pointers. For example, if in SLS mode, the DeliverEvents pointer is set to slsDeliverEvents, but if not in SLS mode, the SLS layer 204 sets the pointer to doDeliverEvents. During the execution of slsDeliverEvents, all events are disregarded that come from the Alternate Screens, except for exposure events discussed below. For the events that come from the Sls Screen, it calls doDeliverEvents.

For processing Expose events, in slsDeliverEvents, the DIX 108 determines that if the event is an Expose event and that it came from an Alternate Screen, it will save the Expose event in a linked list that attaches window IDs to exposure regions. Once an Sls Screen Expose event comes in, the SLS layer 204 finds the correct node in the linked list that associates to the exposed window and sends the Expose event to the client. So, instead of getting multiple Exposure events, the client receives only one Exposure event.

H. Adding Extensions to SLS

A conventional X-Server 102 protocol provides an extension mechanism by which it can be extended for new functionality. An extension refers to a server modification that causes the server to respond to a protocol that differs from the core protocol. The new protocol may be an augmented version of the core protocol, or it may change the behavior of existing requests, replies, errors or events that the core protocol defines.

The Hewlett-Packard X-Server requires all dynamic loaded extensions (DLEs) to have two functions: xxxRegisterFunction and xxxIniFunction. The register function is used to "register" the initialization function with the DDX layer, so that when it is time to initialize the extension, the DDX layer will know what function to call. The SLS X-Server 202 has similar requirements, because not only does the SLS layer 204 need to know what DDX 206a–206n functions to call to initiate the extensions, the SLS layer 204 needs to force the DLE to call the SLS version of the Init function. There are three (3) required functions for a DLE to work properly in an SLS environment.

i) slsXxxInit;

ii) slsXxxUninitialize; and iii) slsXxxRegisterFunction. The slsXxxInit function is used not only to initialize the SLS Layer's 204 extension values, but to call the xxxInit routine for all of the associated DDX 206a–206n layers. This routine requires the use of a structure, called SlsXxxRegisterFunc, that holds all of the DDX 206a–206n Initialization routines for the Alternate Screens. The SlsXxxInit function is initialized by the slsXxxRegisterFunction and needs to, as closely as possible, emulate what happens in the extensions' original initialization routine.

If, after the extensions are initialized, the SLS layer 204 determines that the current SLS configuration is heterogeneous, the SLS layer 204 will uninitialize all of the DLE's in order to switch to a non-SLS configuration. The SLS layer 204 uninitializes the DLEs by calling the SlsXxxUninitialize routine. In such a case, the DDX 206a–206n layers need to know their original initialization routines, not the SLS versions. Therefore, the SlsXxxUninitialize routine needs to re-register the original init routines.

The SlsXxxRegisterFunction routine is set-up in the function slsScreen.c:slsInitializeExtensionRegistrationFunctions, where the Sls-version of the registration routine is substituted for the original version. This way, when the DDX 206a–206n layers go to register an initialization function, they will register it with the SLS layer 204. During execution, the slsXxx.c:slsXxxRegisterFunction saves the original DDX 206a–206n initialization routine in SlsXxx-InitFunc and then registers the SLS initialization routine with the DDX 206a–206n layer so that when the extension initializes itself, it initializes with the SLS Layer 204.

I. Pseudo Code for SLS functions in sls[scr]→pSlsScreen

This section provides more detail as to the nature and structure of each of the SLS functions to which the sls[scr] →pSlsScreen data structure points. This section does not provide executable source code, but rather provides a high level design for source code called pseudo-code. A classification scheme along with possible pseudo-code for each class of functions is presented. Note that a single SLS function may appear in more than one class (e.g., PositionWindow). It is readily apparent that a person skilled in the relevant art can develop a different design for the SLS functions that accommodates the SLS X-Server 202 functionality.

(i) Unwrapped
pAltScreen region pointers will not be controlled by the SLS layer 204. pSlsScreen region pointers will point to those of Alternate Screen 0.

(ii) Trivial
Functions: CloseScreen, SaveScreen, RealizeFont, UnrealizeFont, CreateScreenResources, ConstrainCursor, CursorLimits, Realize Cursor, UnrealizeCursor, RecolorCursor, PointerNonInterestBox, BlockHandler, WakeupHandler Pseudo Code:
for each Alternate Screen
do
 Install next Alternate Screen
 Perform Operation
done
Install Sls Screen -continued (iii) Trivial Plus Round Trip
    Functions:     QueryBestSize
    Pseudo Code:
    for each Alternate Screen
    do
        Install next Alternate Screen
        curResult = Perform Operation
        result = result + curResult
    done
    Install Sls Screen
    return (result)
(iv) Trivial Plus Search
    Functions:     InstallColormap, UninstallColormap,
                   ChangeWindowAttributes, RealizeWindow,
                   UnrealizeWindow, PostValidateTree,
                   StoreColors, ClearToBackground,
                   DestroyWindow, DestroyColormap,
                   DestroyPixmap, SourceValidate,
                   SaveDoomedAreas, RestoreAreas, ClearBacking
                   Store, DrawGuarantee, ClipNotify,
                   PaintWindowBorder, PaintWindowBackground,
                   ValidateGC, ChangeGC, CopyGC, DestroyGC,
                   CopyClip
    Pseudo Code:
    for each Alternate Screen
    do
        Install next Alternate Screen
        Find next Alternate <structure>(window, GC, Cmap, etc.)
        Perform Operation
    done
    Install Sls Screen
(v) Trivial Search Plus Save
    Functions:     ChangeClip, DestroyClip, FillSpans, SetSpans,
                   PutImage, PolyPoint, Polylines, PolySegment,
                   PolyRectangle, PolyArc, PolyFillRect,
                   PolyFillArc, FillPolygon, PolyText8,
                   PolyText16, ImageText8, ImageText16,
                   ImageGlyphBlt, PolyGlyphBlt
    Pseudo Code:
    for each Alternate Screen
    do
        Install next Alternate Screen
        Find next Alternate <structure>(Window, GC, Cmap, etc.)
        Save data points/values to temporary variables
        Perform Operation using temporary variables
    done
    Install Sls Screen
(vi) Conditional
    Functions:     DisplayCursor, SetCursorPosition
    Pseudo Code:
    for each Alternate Screen
    do
        Install next Alternate Screen
        if (criteria)
            Find next Alternate <structure>
            Perform Operation
    done
    Install Sls Screen
(vii) Search
    Functions:     DestroyPixmap
    Pseudo Code:
    for each Alternate Screen
    do
        Install next Alternate Screen
        found = Find next Alternate <structure>
        If (found)
            Perform Operation
    done
    Install Sls Screen
(viii) Calculated
    Functions:     PositionWindow, WindowExposures,
                   TranslateBackingStore
    Pseudo Code:
    for each Alternate Screen
    do
        Install next Alternate Screen
        Find next Alternate <structure>
        Calculate some value/field region
        Perform Operation
    done
    Install Sls Screen
    return (result)
(ix) Creation
    Functions:     CreateWindow, CreateColormap, CreatGC,
                   CreatePixmap
    Pseudo Code:
    for each Alternate Screen
    do
        Install next Alternate Screen
        Create next Alternate <structure>
        Create link to previous Kin <structure>
        Initialize <structure> to default values
        Perform Operation
    done
    Install Sls Screen
    return (result)
    Function:      Partial Checkpoint Evaluation
    Pseudo Code:   Update any Window tree validations
(x) Checkpoint
    Functions:     ValidateTree, PositionWindow, CopyWindow
    Pseudo Code:
    for each Alternate Screen
    do
        Install next Alternate Screen
        Perform "Checkpoint Evaluation" (see below)
        Find next Alternate <structure>
        Perform Operation
    done
    Install Sls Screen
    Function:      Checkpoint Evaluation
    Pseudo Code:
        Update any reparenting
        Update any Window tree validations (ValidateTree only)
        Update all "field" values (e.g., For a Window, check
        mapped, etc.)
(xi) Complex
    Functions:     GetImage
    Pseudo Code:
    Set up return data structure
    for each Alternate Screen
    do
        Install next Alternate Screen
        Find next Alternate <structure>
        Perform Get on return data structure
    done
    Install Sls Screen
    return composed image from Alternate images
    Functions:     CopyArea, CopyPlane
    Pseudo Code:
    Create composite area for each Alternate Screen
    do
        Install next Alternate Screen
        Find next Alternate <structure>
        Copy using composite area as the source
    done
    Install Sls Screen
    Functions:     Create composite Area
    Allocate space for composite image
    for each Alternate Screen
    do
        Install next Alternate Screen
        Copy Alternate Screen's data into composite image
    done
    Install Sls Screen
J. SLS X-Server Initialization To the user, the SLS X-Server 202 provides a method for taling multiple physical devices, and treating them as a single logical screen. Therefore, the SLS X-Server 202 initialization is the only area of the server where the user is exposed directly to Sls. In the chosen embodiment of the present invention, a user must create an X*screens file for SLS X-Server 202 initialization. The X*screens file establishes the chosen SLS configuration and its characteristics.

FIG. 11 illustrates the control flow for SLS X-Server 202 initialization. Server initialization 1102 is handled by two components: an SLS parser 1104 and an SLS loader 1106. Upon a user invoking SLS X-Server 202 initialization 1102, the SLS parser 1104 enters step 1108. In step 1108, the SLS parser 1104 parses the user's SLS configuration and establishes a valid configuration. The valid configuration may or may not be an SLS configuration. If the user properly defined an SLS configuration, then the SLS parser 1104 will establish an SLS configuration to be loaded. If, however, the user improperly attempts to define an SLS configuration, the SLS parser 1104 will establish a single device, non-SLS configuration. After making such a determination and establishing a valid configuration, the SLS parser 1104 verifies the configuration, obtains a list of devices comprising the configuration, and sets up the screen options. After completing step 1108, the Sls parser 1104 transfers control to the SLS loader 1106 by proceeding to step 1110. In step 1110, the SLS loader 1106 loads the device(s) of the configuration established by the SLS parser 1104, sets up the functions to initialize the screen(s) of the configuration, and loads the shared libraries of the device(s). In step 1110, the SLS loader 1106 may load an SLS configuration or a non-SLS configuration depending on the configuration established by the SLS parser 1104 in step 1108. If the SLS loader 1106 loads an SLS configuration, the SLS loader 1106 proceeds from step 1110 to step 1112. In step 1112, the SLS loader 1106 allocates and initializes all of the Sls data structures. After completing step 1112, the SLS loader 1106 has completed the SLS X-Server 202 initialization.

Referring again to step 1110, if the SLS loader 1106 loads a single device, non-SLS configuration, the SLS loader 1106 exits step 1110 and completes the SLS X-Server 202 initialization.

1. SLS Parser

FIG. 12 illustrates the control flow for parsing the SLS 1108. In step 1202, the SLS parser 1104 begins the SLS X-Server 202 initialization by parsing the X*screen file created by the user. The user configures an Sls Screen in the X*screen file via the following syntax:

```
<SingleLogicalScreen> ::=
SingleLogicalScreen<rows><cols>[DeviceList] [Normal Screen Options]
<DeviceList> ::= [device] [device] . . . [device]
<device> ::= /dev/<devicename>
```

Any option set via the "normal screen options" will be propagated to each Alternate Screen. Therefore, if the user specifies a default visual, all of the Alternate Screens will use it as the default (provided they all support the suggested visual). The DeviceList is the mechanism by which the user decides the horizontal and vertical positioning of the screens (physical monitors). Alternate Screens map to the devices in a Row-Major fashion. For example, in the matrix configuration shown in FIG. 4, Alternate Screen X0 404 maps to "/dev/crt", Alternate Screen XI 406 maps to "/dev/crt1", Alternate Screen X2 408 maps to "dev/crt2", and Alternate Screen X3 410 maps to "dev/crt3." Assuming that /dev/crt, /dev/crt1, /dev/crt2, and /dev/crt3 exist as valid graphics devices, the following are examples of user syntax for establishing a valid SLS configuration:

i) Two physical monitors vertical configuration 508 as shown in FIG. 5(C):
 SingleLogicalScreen 2 1
  /dev/crt
  /dev/crt1
ii) Three physical monitors horizontal configuration 504 as shown in FIG. 5(A):
 SingleLogicalScreen 1 3
  /dev/crt
  /dev/crt1
  /dev/crt2
  DefaultVisual
   Depth 24
iii) Matrix configuration 402 as shown in FIG. 5(B):
 SingleLogicalScreen 2 2
  /dev/crt
  /dev/crt1
  /dev/crt2
  /dev/crt3

The order of the device names in the DeviceList determines how the Alternate Screens will be stacked or laid out. For example, in the two physical monitors vertical configuration 508 of example (i) shown above, for the user to get the full effect of Sls, the user should position the physical monitors as shown in configuration 508 of FIG. 5(C). In step 1202, the SLS parser 1104 also stores the list of devices in the sls[scr]→DeviceList data structure for later processing.

After parsing the user defined SLS configuration from the X*screen file, the SLS parser 1104 proceeds to step 1204. In step 1204, the SLS parser 1104 determines whether or not the user defined a valid SLS configuration. If the Sls parser 1104 detects an invalid configuration, the SLS parser proceeds to step 1206. In step 1206, the SLS parser 1104 takes the first device file supplied by the user (if one exists) and installs it as a single device, non-Sls Screen in the current DIX 108 screenInfo.screens[scr] field. This way, at least an X-Server 102 will be installed, thereby providing the user with some display capability. After installation, the SLS parser 1104 proceeds to step 1208. In step 1208, the SLS parser sets the user defined screen options, taken from the X*screen file, for the single device provided that the device can handle the default option value. The SLS parser 1104 completes its processing in step 1208, after which the SLS parser 1104 exits step 1108 and passes control to the SLS loader 1106 by invoking step 1110.

Referring again to step 1204, if the SLS parser 1104 detects a valid SLS configuration, the SLS parser 1104 continues to step 1210. In step 1210, the SLS parser 1104 allocates memory for the SlsRec data structure then proceeds to step 1212. In step 1212, the SLS parser 1104 sets the user defined screen options, taken from the X*screen file, for each device provided that each device can handle the default option value. For example, in example (ii) above which described the user syntax for establishing a valid three physical monitor horizontal configuration 504, the user chose the screen option for a visual depth of value '24.' Therefore, in step 1212, the SLS parser 1104 tells each device's DDX 206a–206n layer visual depth to the value '24,' provided that each device can accept such a value. After step 1212, the SLS parser 1104 proceeds to step 1214. In step 1214, the SLS parser 1104 creates a unique device identifier (called SlsDevice) for each device in the SLS configuration. The SLS loader 1106 uses the unique identifiers to determine whether or not a specific device is used in an SLS configuration. A more detailed description of the Sls loader 1106 is provided below. After step 1214, the Sls parser proceeds to step 1216. In step 1216, the SLS loader 1104 adds Screen and SlsScreen to the token that is passed to the SLS loader 1106. The SLS parser 1104 completes its processing in step 1216, after which the SLS parser 1104 exits step 1108 and passes control to the SLS loader 1106 by invoking step 1110.

2. SLS Loader

FIG. 13 illustrates the control flow for step 1110 of the SLS loader 1106 processing. The SLS loader 1106 begins processing at step 1302 when the SLS parser 1104 completes its processing. In step 1302, the SLS loader 1106 determines whether or not an SLS configuration is to be loaded. If an SLS configuration is not to be loaded, the SLS loader proceeds to step 1304. In step 1304, the SLS loader 1106 loads the device file chosen by the SLS parser in step 1206, thereby creating a single device, non-SLS configuration. After loading the non-SLS configuration, the SLS loader 1106 exits step 1110 and completes the SLS X-Server 202 initialization 1102.

Referring again to step 1302, if the SLS loader 1106 determines that it is to load an SLS configuration, the SLS loader 1106 proceeds to step 1306. In step 1306, the SLS loader 1106 chooses the dynamic loaded extensions (DLEs), such as MBX and DBE, that can run properly on the devices of the SLS configuration. After step 1306, the SLS loader 1106 proceeds to step 1308 and enters a loop for looping through all of the devices defined in the SLS configuration DeviceList. In step 1308, the SLS loader begins with the first device in the DeviceList and determines if there are any more devices in the DeviceList. If there are more devices, the SLS loader 1106 proceeds to step 1310. In step 1310, the SLS loader 1106 opens, maps, and determines what graphics device is installed. The SLS Loader 1106 continues to step 1312 where it advances to the next device in DeviceList. From step 1312, the SLS loader 1106 returs to step 1308 to determine whether or not it has processed every device in DeviceList. If there are more devices to process, the SLS loader 1106 re-enters the loop.

Referring again to step 1308, if the SLS loader 1106 determines that there are no more devices in DeviceList to process, the SLS loader proceeds to step 1314. In step 1314, the SLS loader 1106 determines and assigns the screen initialization functions for each device. The screen initialization functions and list of shared libraries for each device are stored in the sls[scr]→slsLoaderInfo.AltScreenInit data structure. More details of step 1314 are provided below. After step 1314, the SLS loader 1106 continues to step 1316. In step 1316, the SLS loader 1106 composes a list of shared libraries to load. The list comprises a composite list of shared libraries for all of the devices in the DeviceList. The composite list is derived from the sls[scr]→slsLoaderInfo.AltScreenInit data structure created in step 1314. In addition, the SLS loader 1106 adds the composite list to shared library "sls. 1" which contains all of the code necessary to execute the SLS layer 204 with the exception of the initialization code. After the creation of the list of shared libraries, the SLS loader 1106 proceeds to step 1318. In step 1318, the SLS loader 1106 calls the SlsScreenInit function. The SlsScreeninit function installs the SlsScreen pointers and private indices, and initializes each Alternate Screen by calling each Alternate Screen's screen init function stored in the sls[scr]→slsLoaderInfo.AltScreenInit data structure. After completing step 1314, the SLS loader 1106 completes step 1110 and proceeds to step 1112 in FIG. 11 to initialize the SLS data structures. A more detailed description of step 1112 is provided below.

Referring again to step 1314, the SLS loader 1106 enters step 1314 to create a composite list of shared libraries for all of the devices. FIG. 14 illustrates the control flow for step 1314. Upon entering step 1314, the SLS loader 1106 enters step 1402. In step 1402, the SLS loader enters a loop for looping through all of the available brokers. A broker is a component that is capable of specifying what shared libraries are needed to initialize a graphics device. In step 1402, the SLS loader 1106 determines if there are any more brokers in the broker list. If there are more brokers, the SLS loader 1106 proceeds to step 1404. In step 1404, the SLS loader gets a bid from the current broker for each device in the DeviceList. A bid indicates that the current broker is able to initialize a specific device. There may be more than one bid for a specific device. After step 1404, the SLS loader 1106 continues to step 1406. In step 1406, the SLS loader 1106 moves to the next broker in the broker list before returning to step 1402. Upon re-entering step 1402, the SLS loader 1106 determines if there is another broker from which to retrieve bids. If there is another broker, the SLS loader re-enters the loop.

Referring again to step 1402, if there are no more brokers, the SLS loader 1106 proceeds to step 1408. In step 1408, the SLS loader enters a loop for looping through the devices in the DeviceList. The SLS loader 1106 first determines if there are any more devices in the DeviceList. If there are more devices, the SLS loader 1106 proceeds to step 1410. In step 1410, the SLS loader 1106 traverses the list of bids from each broker for the current device, and selects a winning bid. After selecting a winning bid, the SLS loader 1106 continues to step 1412. In step 1412, the SLS loader 1106 stores the winning broker's screen initialization functions and list of shared libraries for the current device in the sls[scr] →slsLoaderInfo.AltScreenInit data field. The slsLoaderInfo data field uses the following data structures:

```
typedef struct _AltScreenInitRec
{
    char *              pScreenInit;        /* The name of the screen init
                                             * function for the current
                                             * Alternate Screen. */
    DlModuleListItemPtr pModuleList;        /* The list of shared modules
                                             * to load for this Alternate
                                             * Screen. */
} AltSereenInitRec, *AltscreenInitptr;
typedef struct _SlsLoaderInfoStruct
{
    hpddxBrokerInfoPtr  pBrokerList;        /* Holds the list of brokers
                                             * bidding on Alternate
                                             * Screens during load time */
    DlDdxScreenDeviceRec deviceList[MAXSCREENS];
                                            /* Holds list of graphic
                                             * devices */
    AltScreenInitRec    AltScreenInit[MAXSCREENS];
                                            /* Holds information
                                             * necessary to load the
                                             * winning broker of each
                                             * Alternate Screen. */
} SlsLoaderInfoRec, *SlsLoaderInfoPtr;
```

The SLS loader 1106 continues to step 1414 in which the SLS loader 1106 moves to the next device in the DeviceList before returning to step 1408. Upon re-entering step 1408, the SLS loader 1106 determines whether there is another device in the DeviceList. If there is, the SLS load 1106 re-enters the loop. If there are no more devices in the DeviceList, the SLS loader 1106 exits step 1314 and continues to step 1316 in FIG. 13.

Referring again to step 1112 in FIG. 11, the SLS loader 1106 enters step 1112 after it has loaded the initialization functions and shared libraries for the Alternate Screens of an Sls Screen. FIG. 15 illustrates the control flow of step 1112 in which the SLS loader 1106 initializes the SLS data structures. The SLS loader 1106 enters step 1502. In step 1502, the SLS loader 1106 allocates and initializes the sls[scr] data structure for the current SLS configuration 'scr.' The values for nSlsRows and nSlsCols can be set because the SingleLogicalScreen entry in the X*screen file has been parsed. The SLS loader 1106 continues to step 1504 in which it allocates and initializes the SLS offset table which indicates the offset of each Alternate Screen within the Sls Screen. The SLS offset table can be initialized at this point because the Alternate Screens have been initialized and the SLS configuration is known. The following code segment could be used to initialize the offset table:

```
void slsInitializeOffsetTable (
    Int32 scr,
    Int32 scrWidth,
    Int32 scrHeight)
{
    Int32 i,j,k,
        x,
        y;
    y = 0;
    for (i=0, k=0; i<sls[scr]->nSlsRows; i++)
    {
        x=0;
        for (j=0; j<sls[scr]->nSlsCols; j++, k++)
        {
            sls[scr]->xOffset[k] = x;
            sls[scr]->yOffset[k] = y;
            x == SLS_ALTERNATE_SCREEN(scr,k) ->
                width;
        }/*for j*/
        y1 -= SLS_ALTERNATE_SCREEN(scr,k)->
            height;
    }/*for I*/
}/*slsInitializeOffsetTable */
```

After initializing the SLS offset table in step 1504, the SLS loader 1106 continues to step 1506. In step 1506, the SLS loader 1106 conducts a greatest common denominator determination on the Alternate Screens. During the greatest common denominator determination, the SLS loader 1106 compiles screen information that shows the maximum configuration that can be supported by the graphics devices supplied by the user. For example, if one device is capable of installing four (4) colormaps simultaneously, but another device only two (2), the SLS loader 1106 will set the maximum number of colormaps that can be installed by any device at one time to two (2). Further, if one device supports a depth twenty-four (24) visual and another does not, the SLS loader 1106 will select the minimum number of visuals that can appear on each screen (i.e. non-depth 24 visuals).

After completing the greatest common denominator determination of step 1506, the SLS loader continues to step 1508. In step 1508, the SLS loader 1106 determines whether the user defined SLS configuration comprises a homogeneous or heterogeneous list of devices. If the SLS configuration comprises a homogeneous list of devices, the SLS loader 1106 completes its processing and exits step 1112, thereby completing the SLS X-Server 202 initialization 1202. If, however, the SLS configuration comprises a heterogeneous list of devices, the SLS loader 1106 proceeds to step 1510. In step 1510, the SLS loader will abandon the SLS configuration and install a single device, non-SLS configuration. This way, at least an X-Server 102 will be installed, thereby providing the user with some display capability. After installing the new configuration, the SLS loader 1106 completes its processing and exits step 1112, thereby completing the SLS X-Server initialization 1102.

K. Conclusion

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer system, comprising:

initialization means for initializing said computer system to recognize and manage an arrangement of a plurality of physical monitors as a single logical screen (SLS);

first translation means for translating a user request to an SLS function, wherein said user request is directed to performing a window operation on said single logical screen; and second translation means for translating said SLS function to a plurality of device dependent functions, wherein each said device dependent function performs said window operation on one of said physical monitors, and wherein said second translation means includes:

unwrapping means for removing said SLS function and installing said plurality of device dependent functions; and wrapping means for removing said plurality of device dependent functions and installing said SLS function, wherein each of said unwrapping and wrapping means comprises two assignment instruction.

2. A computer system according to claim 1, wherein said plurality of physical monitors are homogeneous.

3. A computer system, comprising:

initialization means for initializing said computer system to recognize and manage an arrangement of a plurality of physical monitors as a single logical screen (SLS);

first translation means for translating a user request to an SLS function, wherein said user request is directed to performing a window operation on said single logical screen;

second translation means for translating said SLS function to a plurality of devive dependent functions, wherein each said device dependent function performs said window operation on one of said physical monitors; and single simultaneous display means for displaying a single image on each said physical monitor of said single logical screen.

4. A computer system according to claim 3, wherein said single simultaneous display means is invoked by a user of said computer system from a command via a keyboard.

5. A computer system according to claim 3, wherein said plurality of physical monitors are homogeneous.

6. A computer system, comprising:

initialization means for initializing said computer system to recognize and manage an arrangement of a plurality of physical monitors as a single logical screen (SLS), wherein said initialization means includes means for recognizing and managing a plurality of SLS;

first translation means for translating a user request to an SLS function, wherein said user request is directed to performing a window operation on said single logical screen; and second translation means for translating said SLS function to a plurality of device dependent functions, wherein each said device dependent function performs said window operation on one of said physical monitors.

7. A computer system, comprising:

initialization means for initializing said computer system to recognize and manage an arrangement of a plurality of physical monitors as a single logical screen (SLS), wherein said initialization means includes means for recognizing and managing a combination of one or more SLSs and one or more non-SLS configurations;

first translation means for translating a user request to an SLS function, wherein said user request is directed to performing a window operation on said single logical screen; and second translation means for translating said SLS function to a plurality of device dependent functions, wherein each said device dependent function performs said window operation on one of said physical monitors.

8. A computer system, comprising:

initialization means for initializing said computer system to recognize and manage an arrangement of a plurality of physical monitors as a single logical screen (SLS), wherein said initialization means includes:

parsing means for parsing said arrangement of said plurality of physical monitors comprising said SLS;

first determining means for determining if said arrangement of said plurality of physical monitors establishes a valid SLS;

setup means for allocating data structures and setting user defined screen options;

loading means for loading a plurality of graphics devices each of which corresponds to one of said physical monitors, if said first determining means determines that said plurality of physical monitors establishes a valid SLS;

second determining means for determining if said plurality of physical monitors are homogeneous; and initializing data structure means for allocating and initializing data structures for said SLS and each said physical monitor, if said first determining means determines that said plurality of physical monitors establishes a valid SLS and said second determining means determines that said plurality of physical monitors are homogeneous;

first translation means for translating a user request to an SLS function, wherein said user request is directed to performing a window operation on said single logical screen; and second translation means for translating said SLS function to a plurality of device dependent functions, wherein each said device dependent function performs said window operation on one of said physical monitors.

9. A computer system according to claim 8, wherein said loading means comprises means for loading a single graphics device, if said first determining means determines that said plurality of physical monitors does not establish a valid SLS or if said second determining means determines that said plurality of physical monitors are not homogeneous.

10. A computer system, comprising:

initialization means for initializing said computer system to recognize and manage an arrangement of a plurality of physical monitors as a single logical screen (SLS); and translation means for translating one or more window operations on said SLS, to a plurality of device dependent functions, wherein each said device dependent function performs one said window operation on one of said physical monitors, wherein said translation means includes:

wrapping means for removing said plurality of device dependent functions and installing a plurality of SLS functions each of which corresponds to one said window operation; and unwrapping means for removing said plurality of SLS functions and installing said plurality of device dependent functions, wherein each said device dependent function performs one said window operation on one of said physical monitors, wherein said wrapping and unwrapping means each comprise two assignment instructions.

11. A method for initializing and managing an arrangement of a plurality of physical monitors as a single logical screen (SLS), said method comprising the steps of:

(a) determining if the arrangement of the plurality of physical monitors is a valid SLS;

(b) initializing the SLS and the plurality of physical monitors comprising the SLS, if step (a) determines that the arrangement of the plurality of physical monitors is a valid SLS;

(c) loading the plurality of physical monitors comprising the SLS, if step (a) determines that the arrangement of the plurality of physical monitors is a valid SLS; and (d) translating one or more window operations on the SLS, to a plurality of device dependent functions, wherein each said device dependent function performs one said window operation on one said physical monitor.

12. A method according to claim 11, wherein step (d) comprises the further steps of:

(d.1) wrapping the SLS by removing said plurality of device dependent functions and installing a plurality of SLS functions wherein each SLS function corresponds to one said window operation; and (d.2) unwrapping the SLS by removing said plurality of SLS functions and installing said plurality of device dependent functions;

wherein steps (d.1) and (d.2) each comprise two assignment statements.

13. A method according to claim 11, wherein step (b) comprises the further steps of:

(b.1) determining if the plurality of physical monitors are homogeneous;

(b.2) loading a single graphics device if step (a) determines that the arrangement of the plurality of physical monitors is not a valid SLS, or if step (b.1) determines that the plurality of physical monitors are not homogeneous; and (b.3) allocating and initializing SLS data structures if step (a) determines that the arrangement of the plurality of physical monitors is not a valid SLS, or step (b.1) determines that the plurality of monitors are homogeneous.

14. A method for initializing and managing an arrangement of a plurality of physical monitors as a single logical screen (SLS), said method comprising the steps of:

(a) wrapping the SLS by installing a plurality of SLS functions each of which corresponds to an SLS window operation; and (b) unwrapping the SLS by removing said plurality of SLS functions and installing a plurality of device dependent functions each of which corresponds each said SLS window operation to one specific physical monitor;

wherein steps (a) and (b) are each implemented in two assignment instructions.

15. A computer program product for use with a network-based graphics windowing system, comprising:

a computer useable medium having computer readable program code means embodied in said medium for initializing and managing a plurality of physical monitors of a network-based graphics windowing system as a single logical screen (SLS), said computer program product having:

first computer readable program code means for initializing said network-based graphics windowing system to recognize and manage an arrangement of a plurality of physical monitors as a single logical screen (SLS);

second computer readable program code means for translating a user request to an SLS function, wherein said user request is directed to performing a window operation on said single logical screen; and third computer readable program code means for translating said SLS function to a plurality of device dependent functions wherein each said device dependent function performs said window operation on one of said physical monitors, wherein said third computer readable program code means includes:

unwrapping means for removing said SLS function and installing said plurality of device dependent functions; and wrapping means for removing said plurality of device dependent functions and installing said SLS function, wherein each of said unwrapping and wrapping means comprises two assignment instructions.

16. A computer program product according to claim 15, wherein said plurality of physical monitors are homogeneous.

17. A computer program product for use with a network-based graphics windowing system, comprising;

a computer useable medium having computer readable program code means embodied in said medium for initializing and managing a plurality of physical monitors of a network-based graphics windowing system as a single logical screen (SLS), said computer program product having:

first computer readable program code means for initializing said network-based graphics windowing system to recognize and manage an arrangement of a plurality of physical monitors as a single logical screen (SLS);

second computer readable program code means for translating a user request to an SLS function, wherein said user request is directed to performing a window operation on said single logical screen;

third computer readable program code means for translating said SLS function to a plurality of device dependent functions, wherein each said device dependent function performs said window operation on one of said physical monitors; and fourth computer readable program code means for displaying a single image on each said physical monitor of said single logical screen.

18. A computer program product according to claim 17, wherein said fourth computer readable program code means is invoked by a user command via a keyboard.

19. A computer program product according to claim 17, wherein said plurality of physical monitors are homogeneous.

20. A computer program product for use with a network-based graphics windowing system, comprising:

a computer useable medium having computer readable program code means embodied in said medium for initializing and managing a plurality of physical monitors of a network-based graphics windowing system as a single logical screen (SLS), said computer program product having:

first computer readable program code means for initializing said network-based graphics windowing system to recognize and manage an arrangement of a plurality of physical monitors as a single logical screen (SLS), wherein said first computer readable program code means comprises means for recognizing and managing a plurality of SLSs;

second computer readable program code means for translating a user request to an SLS function, wherein said user request is directed to performing a window operation on said single logical screen; and third computer readable program code means for translating said SLS function to a plurality of device dependent functions, wherein each said device dependent function performs said window operation on one of said physical monitors.

21. A computer program product for use with a network-based graphics windowing system, comprising:

a computer useable medium having computer readable program code means embodied in said medium for initializing and managing a plurality of physical monitors of a network-based graphics windowing system as a single logical screen (SLS), said computer program product having:

first computer readable program code means for initializing said network-based graphics windowing system to recognize and manage an arrangement of a plurality of physical monitors as a single logical screen (SLS), wherein said first computer readable program code means includes means for recognizing and managing a combination of one or more SLSs and one or more non-SLS configurations;

second computer readable program code means for translating a user request to an SLS function, wherein said user request is directed to performing a window operation on said single logical screen; and third computer readable program code means for translating said SLS function to a plurality of device dependent functions, wherein each said device dependent function performs said window operation on one of said physical monitors.

22. A computer program product for use with a network-based graphics windowing system, comprising:

a computer useable medium having computer readable program code means embodied in said medium for initializing and managing a plurality of physical monitors of a network-based graphics windowing system as a single logical screen (SLS), said computer program product having:

first computer readable program code means for initializing said network-based graphics windowing system to recognize and manage an arrangement of a plurality of physical monitors as a single logical screen (SLS), wherein said first computer readable program code means includes:

parsing means for parsing said arrangement of said plurality of physical monitors comprising said SLS;

first determining means for determining if said arrangement of said plurality of physical monitors establishes a valid SLS;
setup means for allocating data structures and setting user defined screen options;
loading means for loading a plurality of graphics devices each of which corresponds to one of said physical monitors, if said first determining means determines that said plurality of physical monitors establishes a valid SLS;
second determining means for determining if said plurality of physical monitors are homogeneous; and
initializing data structure means for allocating and initializing data structures for said SLS and each said physical monitor, if said first determining means determines that said plurality of physical monitors establishes a valid SLS and said second determining means determines that said plurality of physical monitors are homogeneous;
second computer readable program code means for translating a user request to an SLS function, wherein said user request is directed to performing a window operation on said single logical screen; and
third computer readable program code means for translating said SLS function to a plurality of device dependent functions, wherein each said device dependent function performs said window operation on one of said physical monitors.

23. A computer program product according to claim 22, wherein said loading means comprises means for loading a single graphics device, if said first determining means determines that said plurality of physical monitors does not establish a valid SLS or if said second determining means determines that said plurality of physical monitors are not homogeneous.

24. A computer program product for use with a network-based graphics windowing system, comprising:
a computer useable medium having computer readable program code means embodied in said medium for initializing and managing a plurality of physical monitors of a network-based graphics windowing system as a single logical screen (SLS), said computer program product having:
first computer readable program code means for initializing said network-based graphics windowing system to recognize and manage an arrangement of a plurality of physical monitors as a single logical screen (SLS); and
second computer readable program code means for translating one or more window operations on said SLS, to a plurality of device dependent functions, wherein each said device dependent function performs one said window operation on one of said physical monitors, wherein said second computer readable program code means includes:
wrapping means for removing said plurality of device dependent functions and installing a plurality of SLS functions each of which corresponds to one said window operation; and
unwrapping means for removing said plurality of SLS functions and installing said plurality of device dependent functions, wherein each said device dependent function performs one said window operation on one of said physical monitors,
wherein said wrapping and unwrapping means each comprise two assignment instructions.

25. A computer program product for use with a network-based graphics windowing system, comprising:
a computer useable medium having computer readable program code method steps embodied in said medium for initializing and managing a plurality of physical monitors as a single logical screen (SLS), said method steps comprising:
(a) determining if the arrangement of the plurality of physical monitors is a valid SLS;
(b) initializing the SLS and the plurality of physical monitors comprising the SLS, if step (a) determines that the arrangement of the plurality of physical monitors is a valid SLS;
(c) loading the plurality of physical monitors comprising the SLS, if step (a) determines that the arrangement of the plurality of physical monitors is a valid SLS; and
(d) translating one or more window operations on the SLS, to a plurality of device dependent functions, wherein each said device dependent function performs one said window operation on one said physical monitor.

26. A computer program product according to claim 25, wherein step (d) comprises the further steps of:
(d.1) wrapping the SLS by removing said plurality of device dependent functions and installing a plurality of SLS functions wherein each SLS function corresponds to one said window operation; and
(d.2) unwrapping the SLS by removing said plurality of SLS functions and installing said plurality of device dependent functions;
wherein steps (d.1) and (d.2) each comprise two assignment statements.

27. A computer program product according to claim 25, wherein step (b) comprises the further steps of:
(b.1) determining if the plurality of physical monitors are homogeneous;
(b.2) loading a single graphics device if step (a) determines that the arrangement of the plurality of physical monitors is not a valid SLS, or if step (b.1) determines that the plurality of physical monitors are not homogeneous; and
(b.3) allocating and initializing SLS data structures if step (a) determines that the arrangement of the plurality of physical monitors is not a valid SLS, or step (b.1) determines that the plurality of monitors are homogeneous.

28. A computer program product for use with a network-based graphics windowing system, comprising:
a computer useable medium having computer readable program code method steps embodied in said medium for initializing and managing a plurality of physical monitors as a single logical screen (SLS), said method steps comprising:
(a) wrapping the SLS by installing a plurality of SLS functions each of which corresponds to an SLS window operation; and
(b) unwrapping the SLS by removing said plurality of SLS functions and installing a plurality of device dependent functions each of which corresponds each said SLS window operation to one specific physical monitor;
wherein said steps (a) and (b) are each implemented in two assignment instructions.

29. A program storage device readable by a machine, tangibly embodying a program of instructions executable by the machine to perform the means for initializing and managing a plurality of physical monitors of a network-based graphics windowing system as a single logical screen (SLS), said program storage device comprising:

initializing means for initializing said network-based graphics windowing system to recognize and manage an arrangement of a plurality of physical monitors as a single logical screen (SLS);

first translating means for translating a user request to an SLS function, wherein said user request is directed to performing a window operation on said single logical screen; and second translating means for translating said SLS function to a plurality of device dependent functions, wherein each said device dependent function performs said window operation on one of said physical monitors, wherein said second translating means includes:

unwrapping means for removing said SLS function and installing said plurality of device dependent functions; and wrapping means for removing said plurality of device dependent functions and installing said SLS function, wherein each of said unwrapping and wrapping means comprises two assignment instructions.

30. A program storage device according to claim 29, wherein said plurality of physical monitors are homogeneous.

31. A program storage device readable by a machine, tangibly embodying a program of instructions executable by the machine to perform the means for initializing and managing a plurality of physical monitors of a network-based graphics windowing system as a single logical screen (SLS), said program storage device comprising:

initializing means for initializing said network-based graphics windowing system to recognize and manage an arrangement of a plurality of physical monitors as a single logical screen (SLS);

first translating means for translating a user request to an SLS function, wherein said user request is directed to performing a window operation on said single logical screen;

second translating means for translating said SLS function to a plurality of device dependent functions, wherein each said device dependent function performs said window operation on one of said physical monitors; and single simultaneous display means for displaying a single image on each said physical monitor of said single logical screen.

32. A program storage device according to claim 31, wherein said single simultaneous display means is invoked by a user command via a keyboard.

33. A program storage device according to claim 31, wherein said plurality of physical monitors are homogeneous.

34. A program storage device readable by a machine, tangibly embodying a program of instructions executable by the machine to perform the means for initializing and managing a plurality of physical monitors of a network-based graphics windowing system as a single logical screen (SLS), said program storage device comprising:

initializing means for initializing said network-based graphics windowing system to recognize and manage an arrangement of a plurality of physical monitors as a single logical screen (SLS), wherein said initialization means comprises means for recognizing and managing a plurality of SLSs;

first translating means for translating a user request to an SLS function, wherein said user request is directed to performing a window operation on said single logical screen; and second translating means for translating said SLS function to a plurality of device dependent functions, wherein each said device dependent function performs said window operation on one of said physical monitors.

35. A program storage device readable by a machine, tangibly embodying a program of instructions executable by the machine to perform the means for initializing and managing a plurality of physical monitors of a network-based graphics windowing system as a single logical screen (SLS), said program storage device comprising:

initializing means for initializing said network-based graphics windowing system to recognize and manage an arrangement of a plurality of physical monitors as a single logical screen (SLS), wherein said initialization means includes means for recognizing and managing a combination of one or more SLSs and one or more non-SLS configurations;

first translating means for translating a user request to an SLS function, wherein said user request is directed to performing a window operation on said single logical screen; and second translating means for translating said SLS function to a plurality of device dependent functions, wherein each said device dependent function performs said window operation on one of said physical monitors.

36. A program storage device readable by a machine, tangibly embodying a program of instructions executable by the machine to perform the means for initializing and managing a plurality of physical monitors of a network-based graphics windowing system as a single logical screen (SLS), said program storage device comprising:

initializing means for initializing said network-based graphics windowing system to recognize and manage an arrangement of a plurality of physical monitors as a single logical screen (SLS), wherein said initialization means includes:

parsing means for parsing said arrangement of said plurality of physical monitors comprising said SLS;

first determining means for determining if said arrangement of said plurality of physical monitors establishes a valid SLS;

setup means for allocating data structures and setting user defined screen options;

loading means for loading a plurality of graphics devices each of which corresponds to one of said physical monitors, if said first determining means determines that said plurality of physical monitors establishes a valid SLS;

second determining means for determining if said plurality of physical monitors are homogeneous; and initializing data structure means for allocating and initializing data structures for said SLS and each said physical monitor, if said first determining means determines that said plurality of physical monitors establishes a valid SLS and said second determining means determines that said plurality of physical monitors are homogeneous;

first translating means for translating a user request to an SLS function, wherein said user request is directed to performing a window operation on said single logical screen; and second translating means for translating said SLS function to a plurality of device dependent functions, wherein each said device dependent function performs said windows operation on one of said physical monitors.

37. A program storage device according to claim 36, wherein said loading means comprises means for loading a single graphics device, if said first determining means determines that said plurality of physical monitors does not establish a valid SLS or if said second determining means determines that said plurality of physical monitors are not homogeneous.

38. A program storage device readable by a machine, tangibly embodying a program of instructions executable by the machine to perform the means for initializing and managing a plurality of physical monitors of a network-based graphics windowing system as a single logical screen (SLS), said program storage device comprising:

initialization means for initializing said network-based graphics windowing system to recognize and manage an arrangement of a plurality of physical monitors as a single logical screen (SLS); and translation means for translating one or more window operations on said SLS, to a plurality of device dependent functions, wherein each said device dependent function performs one said window operation on one of said physical monitors, wherein said translation means includes:

wrapping means for removing said plurality of device dependent functions and installing a plurality of SLS functions each of which corresponds to one said window operation; and unwrapping means for removing said plurality of SLS functions and installing said plurality of device dependent functions, wherein each said device dependent function performs one said window operation on one of said physical monitors, wherein said wrapping and unwrapping means each comprise two assignment instructions.

39. A program storage device readable by a machine, tangibly embodying a program of instructions executable by the machine to perform method steps for initializing and managing a plurality of physical monitors of a network-based graphics windowing system as a single logical screen (SLS), said method steps comprising:

(a) determining if the arrangement of the plurality of physical monitors is a valid SLS;

(b) initializing the SLS and the plurality of physical monitors comprising the SLS, if step (a) determines that the arrangement of the plurality of physical monitors is a valid SLS;

(c) loading the plurality of physical monitors comprising the SLS, if step (a) determines that the arrangement of the plurality of physical monitors is a valid SLS; and (d) translating one or more window operations on the SLS, to a plurality of device dependent functions, wherein each said device dependent function performs one said window operation on one said physical monitor.

40. A program storage device according to claim 39, wherein step (d) comprises the further steps of:

(d.1) wrapping the SLS by removing said plurality of device dependent functions and installing a plurality of SLS functions wherein each SLS function corresponds to one said window operation; and (d.2) unwrapping the SLS by removing said plurality of SLS functions and installing said plurality of device dependent functions;

wherein steps (d.1) and (d.2) each comprise two assignment statements.

41. A program storage device according to claim 39, wherein step (b) comprises the further steps of:

(b.1) determining if the plurality of physical monitors are homogeneous;

(b.2) loading a single graphics device if step (a) determines that the arrangement of the plurality of physical monitors is not a valid SLS, or if step (b.1) determines that the plurality of physical monitors are not homogeneous; and (b.3) allocating and initializing SLS data structures if step (a) determines that the arrangement of the plurality of physical monitors is not a valid SLS, or step (b.1) determines that the plurality of monitors are homogeneous.

42. A program storage device readable by a machine, tangibly embodying a program of instructions executable by the machine to perform method steps for initializing and managing a plurality of physical monitors of a network-based graphics windowing system as a single logical screen (SLS), said method steps comprising:

(a) wrapping the SLS by installing a plurality of SLS functions each of which corresponds to an SLS window operation; and (b) unwrapping the SLS by removing said plurality of SLS functions and installing a plurality of device dependent functions each of which corresponds each said SLS window operation to one specific physical monitor;

wherein said steps (a) and (b) are each implemented in two assignment instructions.

\* \* \* \* \*

UNITED STATES PATENT AND TRADEMARK OFFICE
CERTIFICATE OF CORRECTION

PATENT NO.    : 6,088,005
DATED         : July 11, 2000
INVENTOR(S)   : Jeffrey J. Walls et al.

It is certified that error appears in the above-identified patent and that said Letters Patent is hereby corrected as shown below:

<u>Column 9,</u>
Line 45, after "follows" insert -- : --

<u>Column 30,</u>
Line 33, delete "instruction" and insert therefor -- instructions --
Line 46, delete "devive" and insert therefor -- device --

Signed and Sealed this

Twenty-third Day of July, 2002

*Attest:*

JAMES E. ROGAN
*Attesting Officer*    *Director of the United States Patent and Trademark Office*